(12) United States Patent
Ren et al.

(10) Patent No.: US 11,989,385 B2
(45) Date of Patent: May 21, 2024

(54) CURSOR DISPLAY METHOD AND ELECTRONIC DEVICE

(71) Applicant: Honor Device Co., Ltd., Shenzhen (CN)

(72) Inventors: Jie Ren, Shenzhen (CN); Liwei Huang, Shenzhen (CN); Wenjie Chen, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/025,720

(22) PCT Filed: May 16, 2022

(86) PCT No.: PCT/CN2022/093154
§ 371 (c)(1),
(2) Date: Mar. 10, 2023

(87) PCT Pub. No.: WO2022/262502
PCT Pub. Date: Dec. 22, 2022

(65) Prior Publication Data
US 2023/0350534 A1    Nov. 2, 2023

(30) Foreign Application Priority Data

Jun. 16, 2021  (CN) .......................... 202110669593.0

(51) Int. Cl.
*G06F 3/04812* (2022.01)

(52) U.S. Cl.
CPC ................. *G06F 3/04812* (2013.01); *G06F 2203/04801* (2013.01)

(58) Field of Classification Search
CPC ................. G06F 3/04812; G06F 2203/04801
See application file for complete search history.

(56) References Cited

U.S. PATENT DOCUMENTS

| 5,805,165 A * | 9/1998 | Thorne, III | G06F 3/038 715/823 |
| 10,671,265 B2 | 6/2020 | Lee et al. | |
| 10,788,947 B1 * | 9/2020 | Walker | G06F 3/038 |
| 2007/0022391 A1 * | 1/2007 | Kim | G06F 3/04812 715/861 |

(Continued)

FOREIGN PATENT DOCUMENTS

| CN | 105744337 A | 7/2016 |
| CN | 106547461 A | 3/2017 |

(Continued)

OTHER PUBLICATIONS

EP/22823984.4, Search Report, mailing date Mar. 5, 2024.

*Primary Examiner* — Asher D Kells
(74) *Attorney, Agent, or Firm* — Leydig, Voit & Mayer, Ltd.

(57) ABSTRACT

This application provides a cursor display method and an electronic device. The method includes: a cursor system may display a cursor on a display interface and move the cursor on the display interface based on a user operation. When the cursor moves to a control, a view system may redraw and display the cursor in the control to implement an adsorption feedback effect of the cursor, so that a user may determine that an actual position of the cursor has moved to the control.

20 Claims, 30 Drawing Sheets

(56) References Cited

U.S. PATENT DOCUMENTS

| | | | |
|---|---|---|---|
| 2008/0244460 A1 | 10/2008 | Louch | |
| 2013/0125066 A1* | 5/2013 | Klein | G06F 3/04812 |
| | | | 715/862 |
| 2014/0047392 A1 | 2/2014 | Kim et al. | |
| 2014/0053111 A1* | 2/2014 | Beckman | G06F 3/14 |
| | | | 345/672 |
| 2015/0106769 A1 | 4/2015 | Yamazaki et al. | |
| 2016/0085410 A1* | 3/2016 | Kwon | G06F 3/04886 |
| | | | 345/173 |
| 2016/0188148 A1* | 6/2016 | Lee | G06F 3/0485 |
| | | | 715/786 |
| 2016/0231898 A1* | 8/2016 | Lee | G06F 3/0346 |
| 2020/0167058 A1 | 5/2020 | Ragan, Jr. | |
| 2021/0240332 A1* | 8/2021 | Walkin | G06F 3/0489 |

FOREIGN PATENT DOCUMENTS

| | | |
|---|---|---|
| CN | 107918481 A | 4/2018 |
| CN | 108459702 A | 8/2018 |
| CN | 113760137 A | 12/2021 |
| JP | 8297543 A | 11/1996 |

\* cited by examiner

CURSOR DISPLAY METHOD AND ELECTRONIC DEVICE

CROSS-REFERENCE TO RELATED APPLICATIONS

This application is a national stage of International Application No. PCT/CN2022/093154, filed on May 16, 2022, which claims priority to Chinese Patent Application No. 202110669593.0, filed on Jun. 16, 2021. The disclosures of both of the aforementioned applications are hereby incorporated by reference in their entireties.

TECHNICAL FIELD

This application relates to the field of terminal devices, and in particular, to a cursor display method and an electronic device.

BACKGROUND

Currently, a control mode of a tablet is generally designed based on a finger operation. That is, the tablet may perform a corresponding action in response to a received operation of touching a display screen of the tablet performed by a user. When the tablet is connected to another external device, such as a mouse or a touchpad, a solution of finger touch cannot be applied.

SUMMARY

This application provides a cursor display method and an electronic device. In the method, a cursor may draw the cursor through different controls, so as to implement a feedback effect of the cursor moving to a control.

According to a first aspect, this application provides an electronic device. The electronic device includes a cursor system and a view system. The cursor system is configured to display a first cursor on a display interface. The cursor system moves the first cursor to a first control on the display interface in response to a received first user operation. The cursor system detects that a center of the first cursor moves to an edge of the first control, and cancels displaying of the first cursor, and the cursor system cancels displaying of the first cursor. The view system is configured to display a second cursor in the first control. The view system gradually amplifies and deforms the second cursor in the first control to obtain a third cursor. A size of the third cursor is less than or equal to a size of the first control. In this way, through cooperation between different cursor systems and view systems, after the cursor moves to the control, a dynamic effect of the cursor jumping into the control may be implemented. The view system may redraw the cursor in the control, and enlarge and deform the cursor to implement an adsorption effect, so that when a user controls an electronic device through an external device, the user may determine that the cursor moves to the control through a feedback of the cursor.

For example, the first user operation may be moving a mouse by the user. The first user operation may further be a finger of the user or a stylus swiping on a touchpad.

For example, the cursor system and the view system may be located at an application layer of the electronic device.

For example, the cursor moves to the edge of the first control, that is, moves to an edge of a hot zone of the control described in the following implementation. That is, the hot zone belongs to the control.

According to the first aspect, the view system is specifically configured to obtain a movement direction of the first cursor in a case that the center of the first cursor moves to the edge of the first control. The view system displays the second cursor on an extension line in the movement direction of the first cursor in the first control. In this way, the view system may determine a position of the cursor in the control based on a movement direction of the cursor, and draw a cursor at a corresponding position.

According to the first aspect, or according to any implementation of the first aspect, the view system is specifically configured to obtain a position of the first cursor in a case that the center of the first cursor moves to the edge of the first control. The view system displays the second cursor on an extension line in a vertical direction of the position of the first cursor in the first control; or the view system displays the second cursor on an extension line in a horizontal direction of the position of the first cursor in the first control. In this way, the view system may draw the cursor at the corresponding position in the control based on a set direction (such as a horizontal direction or a vertical direction). For example, if the first cursor is located at an upper edge or a lower edge of the control before disappearing, the set direction may be the vertical direction. If the first cursor is located at a left edge or a right edge of the control before disappearing, the set direction may be the horizontal direction.

According to the first aspect, or according to any implementation of the first aspect, the view system is specifically configured to display the second cursor at a position in the first control that is tangent to the edge of the first control. For example, the second cursor is close to the edge of the first control. For example, there may be a specific gap between the second cursor and the edge of the first control. For example, the second cursor may be tangent to the edge of the first control. For example, the edge of the first control may optionally be an edge closest to the second cursor.

According to the first aspect, or according to any implementation of the first aspect, a shape of the second cursor is the same as a shape of the first cursor. In this way, a continuous animation effect may be implemented. That is, after the cursor disappears, the cursor reappears in a space.

According to the first aspect, or according to any implementation of the first aspect, a shape of the second cursor is different from a shape of the first cursor. For example, the second cursor may be a shape of the first control that is scaled down by proportion. For example, the second cursor may also be in another set shape, for example, a round rectangle, or the like, which is not limited in this application.

According to the first aspect, or according to any implementation of the first aspect, a shape of the third cursor is the same as a shape of the first control. In this way, this application provides a feedback manner of a cursor, in which the cursor may gradually be deformed from an original shape to a shape the same as the shape of the first control, so as to enrich an animation effect fed back by the cursor.

According to the first aspect, or according to any implementation of the first aspect, a shape of the third cursor is different from a shape of the first control. For example, the shape of the third cursor may approximate the shape of the first control. For example, the shape of the third cursor may be a round rectangle.

According to the first aspect, or according to any implementation of the first aspect, the third cursor is displayed below the first control. In this way, the third cursor lining below the first control does not affect a color of the first control, so that the first control still maintains an original color in a process in which the cursor is deformed and displayed.

According to the first aspect, or according to any implementation of the first aspect, the first control is a desktop icon control, and transparency of the third cursor is a maximum value. In this way, when the cursor is gradually deformed in a desktop icon, the cursor may gradually become transparent up to the maximum value.

According to the first aspect, or according to any implementation of the first aspect, the view system is further configured to move the second cursor in the first control in response to a received second user operation in a process of gradually enlarging and deforming the second cursor in the first control. In this way, this application further provides a pulling solution, so that the cursor may move in the control along with a movement of the external device. In this way, a current actual position of the cursor is fed back, so that the user may determine the actual position of the cursor through a movement of the cursor in the control.

According to the first aspect, or according to any implementation of the first aspect, the view system is further configured to move the third cursor in the first control in response to a received third user operation. In this way, this application further provides a pulling solution, so that the cursor may move in the control along with a movement of the external device. In this way, a current actual position of the cursor is fed back, so that the user may determine the actual position of the cursor through a movement of the cursor in the control.

According to the first aspect, or according to any implementation of the first aspect, the first cursor is in a shape of a round rectangle. In this way, in this application, the cursor may be displayed to feed back a movement track and a position of the external device on a display interface of the electronic device, so that the user may control the external device based on a position of the cursor that is displayed.

According to the first aspect, or according to any implementation of the first aspect, the first cursor is drawn by the cursor system based on a first circle; a radius of the first circle is r, and a circumference of the first circle is $2\pi r$; and a circumference of the first cursor is greater than $2\pi r$ and less than 8 r. For example, a circle is tangent to the round rectangle of the cursor. That is, a circumference of the round rectangle is greater than a circumference of the circle and less than a circumference of a circumscribed square of the circle.

According to the first aspect, or according to any implementation of the first aspect, the first cursor is drawn by the cursor system based on a first circle; a radius of the first circle is r, and a circumference of the first circle is $2\pi r$; and a circumference of the first cursor is greater than $4\sqrt{2}r$ and less than $2\pi r$. For example, a circle is tangent to the round rectangle of the cursor. That is, a circumference of the round rectangle is less than a circumference of the circle and greater than a circumference of an inscribed square of the circle.

According to a second aspect, this application provides a cursor display method. The method includes: displaying a first cursor on a display interface; moving the first cursor to a first control on the display interface in response to a received first user operation; detecting that a center of the first cursor moves to an edge of the first control, and canceling displaying of the first cursor; displaying a second cursor in the first control; and gradually enlarging and deforming the second cursor in the first control to obtain a third cursor, where a size of the third cursor is less than or equal to a size of the first control.

According to a second aspect, the displaying a second cursor in the first control includes: obtaining a movement direction of the first cursor in a case that the center of the first cursor moves to the edge of the first control; and displaying the second cursor on an extension line in the movement direction of the first cursor in the first control.

According to a second aspect, or according to any implementation of the second aspect, the displaying a second cursor in the first control includes: obtaining a position of the first cursor in a case that the center of the first cursor moves to the edge of the first control; and displaying the second cursor on an extension line in a vertical direction of the position of the first cursor in the first control; or displaying the second cursor on an extension line in a horizontal direction of the position of the first cursor in the first control.

According to a second aspect, or according to any implementation of the second aspect, the displaying a second cursor in the first control includes: displaying the second cursor at a position in the first control that is tangent to the edge of the first control.

According to a second aspect, or according to any implementation of the second aspect, a shape of the second cursor is the same as a shape of the first cursor.

According to a second aspect, or according to any implementation of the second aspect, a shape of the second cursor is different from a shape of the first cursor.

According to a second aspect, or according to any implementation of the second aspect, a shape of the third cursor is the same as a shape of the first control.

According to a second aspect, or according to any implementation of the second aspect, a shape of the third cursor is different from a shape of the first control.

According to a second aspect, or according to any implementation of the second aspect, the third cursor is displayed below the first control.

According to a second aspect, or according to any implementation of the second aspect, the first control is a desktop icon control, and transparency of the third cursor is a maximum value.

According to a second aspect, or according to any implementation of the second aspect, the gradually enlarging and deforming the second cursor in the first control to obtain a third cursor includes: moving the second cursor in the first control in response to a received second user operation in a process of gradually enlarging and deforming the second cursor in the first control.

According to a second aspect, or according to any implementation of the second aspect, the method further includes: moving the third cursor in the first control in response to a received third user operation.

According to a second aspect, or according to any implementation of the second aspect, the first cursor is in a shape of a round rectangle.

According to a second aspect, or according to any implementation of the second aspect, the first cursor is drawn based on a first circle; a radius of the first circle is r, and a circumference of the first circle is $2\pi r$; and a circumference of the first cursor is greater than $2\pi r$ and less than 8 r.

According to a second aspect, or according to any implementation of the second aspect, the first cursor is drawn based on a first circle; a radius of the first circle is r, and a circumference of the first circle is $2\pi r$; and a circumference of the first cursor is greater than $4\sqrt{2}r$ and less than $2\pi r$.

The second aspect and any implementation of the second aspect respectively correspond to the first aspect and any implementation of the first aspect. For beneficial effects corresponding to the second aspect and any implementation of the second aspect, reference may be made to technical effects corresponding to the first aspect and any implementation of the first aspect, and details are not repeated herein.

According to a third aspect, this application provides an electronic device. The electronic device includes a memory and a processor. The processor is coupled to the memory. The memory stores program instructions, and when the program instructions are executed by the processor, the electronic device is enabled to execute instructions of the method in the second aspect or the method in any possible implementation of the second aspect.

According to a fourth aspect, this application provides a computer-readable storage medium, configured to store a computer program. The computer program includes instructions used for performing the method in the second aspect or the method in any possible implementation of the second aspect.

According to a fifth aspect, this application provides a computer program. The computer program includes instructions used for performing the method in the second aspect or the method in any possible implementation of the second aspect.

According to a sixth aspect, this application provides a chip, including a processing circuit and a transceiver pin. The transceiver pin and the processing circuit communicate with each other through an internal connection path. The processing circuit performs the method in the second aspect or the method in any possible implementation of the second aspect, to control a receiving pin to receive a signal, and to control a sending pin to send a signal.

According to a seventh aspect, this application provides a cursor display system. The system includes an electronic device and an external device. The electronic device performs data exchange with the external device through a first connection. The electronic device may implement the method in the second aspect or the method in any possible implementation of the second aspect. For example, the external device may be a mouse or a touchpad. For example, the electronic device may be an electronic device with a display screen, such as a tablet, a mobile phone, and an in-vehicle device. For example, the first connection may be a Bluetooth connection or a Wi-Fi connection, which is not limited in this application.

DESCRIPTION OF EMBODIMENTS

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

In addition, the term "and/or" in this specification describes only an association relationship for describing associated objects and represents that three relationships may exist. For example, A and/or B may represent the following three cases: Only A exists, both A and B exist, and only B exists.

The terms "first" and "second" in the specification and claims of the embodiments of this application are intended to distinguish between different objects but do not indicate a particular order of objects. For example, a first target object, a second target object, and the like are intended to distinguish between different target objects but do not indicate a particular order of the target objects.

In the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "example" or "for example" or the like is intended to present a related concept in a specific manner.

In the description of the embodiments of this application, "plurality" means two or more unless otherwise described. For example, a plurality of processing units refer to two or more processing units; and a plurality of systems refer to two or more systems.

Figure 1:
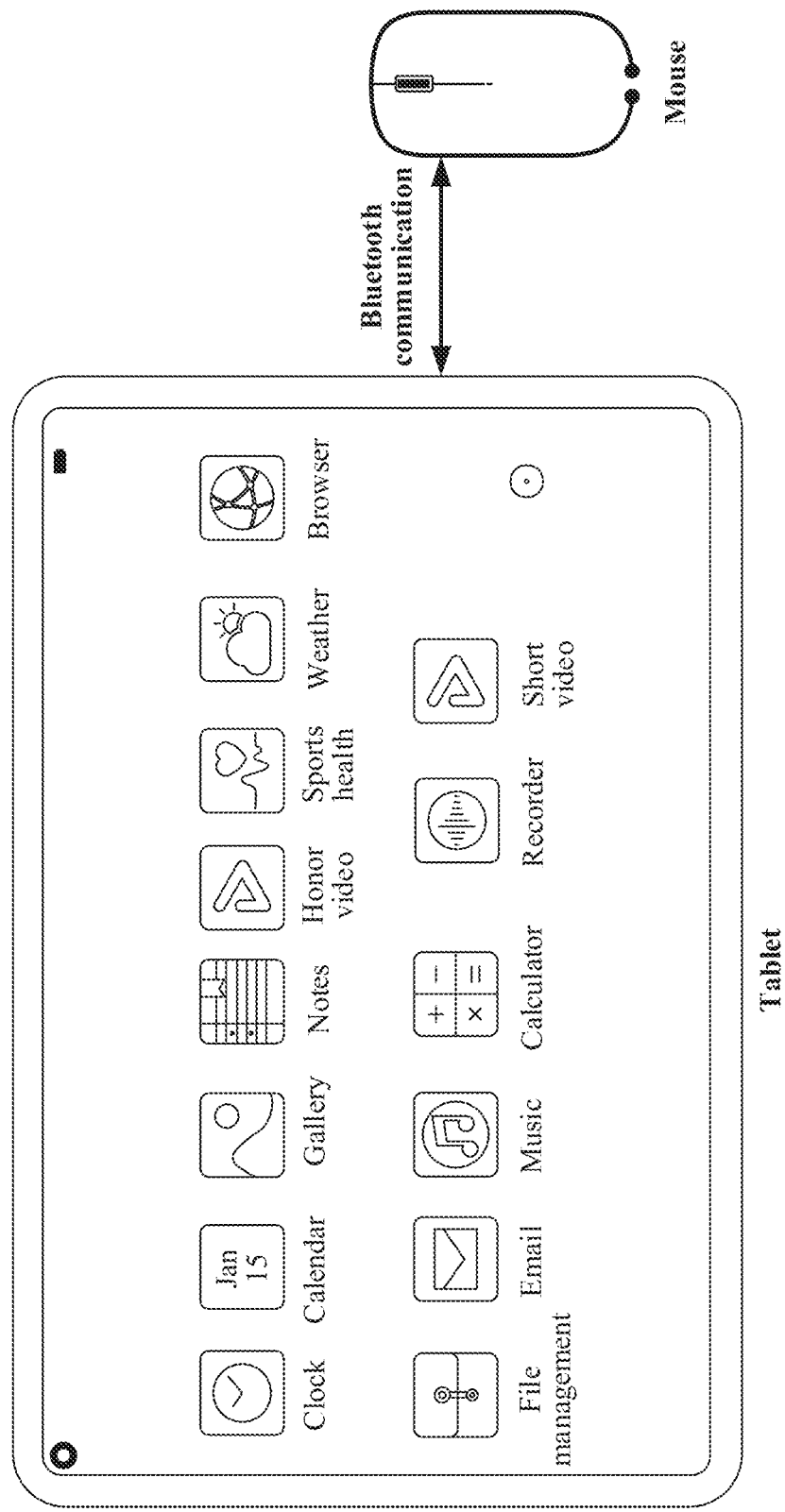
FIG. 1 exemplarily shows a schematic diagram of an application scenario.

Before technical solutions of the embodiments of this application are described, application scenarios of the embodiments of this application are first described with reference to the accompanying drawings. FIG. 1 is a schematic diagram of an application scenario according to an embodiment of this application. The application scenario includes a tablet and a mouse. Optionally, the tablet performs data exchange with the mouse through a Bluetooth connection. For example, in the embodiments of this application, after the tablet is connected to the mouse, a cursor may be displayed on a display interface of the tablet. A user may move the mouse through a position of the cursor displayed on the tablet to control a movement of the cursor on the tablet. It should be noted that in the embodiments of this application, when the tablet is connected to the mouse, a cursor display manner on the tablet is used as an example. In other embodiments, the cursor display manner in the embodiments of this application may further be applied to other application scenarios, for example, may be applied to a scenario in which the tablet is connected to an external device such as a touchpad, which is not limited in this application. Further, it should be noted that in the embodiments of this application, a cursor display manner on the tablet is used as an example for description. In other embodiments, the cursor display manner in the embodiments of this application may also be applied to other electronic devices such as a mobile phone, a television, an in-vehicle device, or the like, which is not limited in this application.

Figure 2:
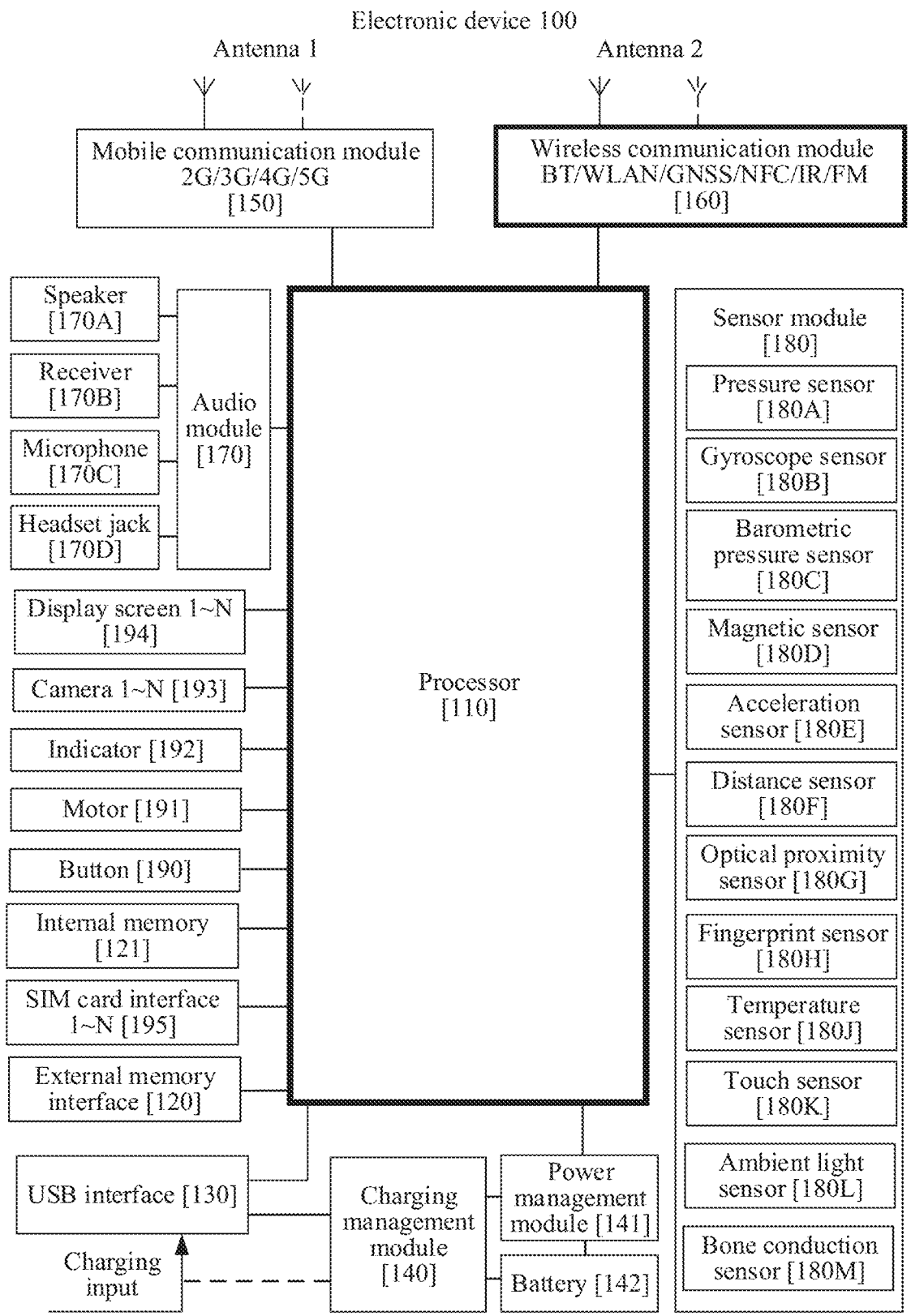
FIG. 2 exemplarily shows a schematic diagram of a hardware structure of an electronic device.

FIG. 2 is a schematic structural diagram of an electronic device 200. It should be understood that the electronic device 200 shown in FIG. 2 is only an example of the electronic device, and may include more or fewer components than those shown in FIG. 2, or combine two or more components, or have a different component configuration. The various components shown in FIG. 2 may be implemented in hardware including one or more signal processing circuits and/or application-specific integrated circuits, software, or a combination of hardware and software.

The electronic device 200 may include: a processor 210, an external memory interface 220, an internal memory 221, a universal serial bus (USB) interface 230, a charging management module 240, a power management module 241, a battery 242, an antenna 1, an antenna 2, a mobile communication module 250, a wireless communication module 260, and an audio module 270, a speaker 270A, a telephone receiver 270B, a microphone 270C, a headset jack 270D, a sensor module 280, a key 290, a motor 291, an indicator 292, a camera 293, a display screen 294, a subscriber identity module (SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, and a touch sensor 280K, an ambient light sensor 280L, a bone conduction sensor 280M, and the like.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the electronic device 200. The controller may generate an operation control signal according to an instruction operation code and a timing signal, to complete the control of fetching and executing an instruction.

A memory may be further configured in the processor 210, to store instructions and data. In some embodiments, the memory in the processor 210 is a cache. The memory may store an instruction or data that has just been used or cyclically used by the processor 210. If the processor 210 needs to use the instruction or the data again, the processor 210 may directly invoke the instruction or the data from the memory, to avoid repeated access and reduce a waiting time of the processor 210, thereby improving system efficiency.

In some embodiments, the processor 210 may include one or more interfaces. The interface may include an integrated circuit (I2C) interface, an integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The USB interface 230 is an interface that conforms to a USB standard specification, and may be specifically a mini USB interface, a micro USB interface, a USB Type C interface, or the like. The USB interface 230 may be configured to be connected to the charger to charge the electronic device 200, or may be used for data transmission between the electronic device 200 and the peripheral device, The USB interface may also be connected to a headset to play audio through the headset. The interface may alternatively be configured to connect to another electronic device such as an AR device.

It may be understood that a schematic interface connection relationship between the modules in this embodiment of this application is merely an example for description, and constitutes no limitation on the structure of the electronic device 200. In some other embodiments of this application, the electronic device 200 may alternatively use an interface connection manner different from that in the foregoing embodiment, or use a combination of a plurality of interface connection manners.

The charging management module 240 is configured to receive a charging input from a charger. The charger may be a wireless charger or may be a wired charger. In some embodiments of wired charging, the charging management module 240 may receive charging input of a wired charger by using the USB interface 230. In some embodiments of wireless charging, the charging management module 240 may receive wireless charging input by using a wireless charging coil of the electronic device 200. When charging the battery 242, the charging management module 240 may further supply power to the electronic device through the power management module 241.

The power management module 241 is configured to connect to the battery 242, the charging management module 240, and the processor 210. The power management module 241 receives input from the battery 242 and/or the charging management module 240, to supply power to the processor 210, the internal memory 221, an external memory, the display screen 294, the camera 293, the wireless communication module 260, and the like. The power management module 241 may be further configured to monitor parameters such as a battery capacity, a battery cycle count, and a battery state of health (electric leakage and impedance). In some other embodiments, the power management module 241 may be alternatively disposed in the processor 210. In some other embodiments, the power management module 241 and the charging management module 240 may further be configured in a same device.

A wireless communication function of the electronic device 200 may be implemented by using the antenna 1, the antenna 2, the mobile communication module 250, the wireless communication module 260, the modem processor, the baseband processor, and the like.

The antenna 1 and the antenna 2 are configured to transmit and receive an electromagnetic wave signal. Each antenna of the electronic device 200 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 250 may provide a solution to wireless communication such as 2G/3G/4G/5G applicable to the electronic device 200. The mobile communication module 250 may include at least one filter, a switch, a power amplifier, a low noise amplifier (LNA), and the like. The mobile communication module 250 may receive an electromagnetic wave through the antenna 1, perform processing such as filtering and amplification on the received electromagnetic wave, and transmit a processed electromagnetic wave to the modem processor for demodulation. The mobile communication module 250 may further amplify a signal modulated by the modem processor, and convert the signal into an electromagnetic wave for radiation through the antenna 1. In some embodiments, at least some function modules of the mobile communication module 250 may be arranged in the processor 210. In some embodiments, at least some function modules of the mobile communication module 250 and at least some modules of the processor 210 may be disposed in a same component.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the speaker 270A, the phone receiver 270B, and the like), or displays an image or a video through the display screen 294. In some embodiments, the modem processor may be an independent device. In some other embodiments, the modem processor may be independent of the processor 210, and the modem processor and the mobile communication module 250 or another function module may be disposed in a same component.

The wireless communication module 260 may provide a solution to wireless communication applicable to the electronic device 200, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communication module 260 may be one or more components into which at least one communication processing module is integrated. The wireless communication module 260 receives an electromagnetic wave by using the antenna 2, performs frequency modulation and filtering on an electromagnetic wave signal, and sends a processed signal to the processor 210. The wireless communication module 260 may alternatively receive a to-be-sent signal from the processor 210, perform frequency modulation and amplification on the to-be-sent signal, and convert the signal into an electromagnetic wave for radiation by using the antenna 2.

In some embodiments, the antenna 1 and the mobile communication module 250 of the electronic device 200 are coupled, and the antenna 2 and the wireless communication module 260 of the electronic device 200 are coupled, so that the electronic device 200 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), and a Beidou navigation satellite system (BDS), a quasi-zenith satellite system (QZSS) and/or a satellite based augmentation system (SBAS).

The electronic device 200 implements a display function by using the GPU, the display screen 294, the application processor, and the like. The GPU is a microprocessor for image processing, and is connected to the display screen 294 and the application processor. The GPU is configured to perform mathematical and geometric calculations and to render graphics. The processor 210 may include one or more GPUs and execute program instructions to generate or change display information.

The display screen 294 is configured to display an image, a video, and the like. The display screen 294 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), and the like. In some embodiments, the electronic device 200 may include one or N display screens 294, and N is a positive integer greater than 1.

The electronic device 200 can implement a photographing function by using the ISP, the camera 293, the video codec, the GPU, the display screen 294, the application processor, and the like.

The ISP is configured to process data fed back by the camera 293. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may further optimize noise point, brightness, and skin tone algorithms. The ISP may further optimize parameters such as exposure and color temperature of a shooting scene. In some embodiments, the ISP may be disposed in the camera 293.

The camera 293 is configured to capture a static image or a video. An optical image of an object is generated through a lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device 200 may include one or N cameras 293, and N is a positive integer greater than 1.

The digital signal processor is configured to process a digital signal, and in addition to a digital image signal, may further process another digital signal. For example, when the electronic device 200 performs frequency selection, the digital signal processor is configured to perform Fourier transform and the like on frequency energy.

The video codec is configured to compress or decompress a digital video. The electronic device 200 may support one or more video codecs. In this way, the electronic device 200 may play or record videos in a plurality of encoding formats, for example, moving picture experts group (MPEG) 1, MPEG 2, MPEG 3, and MPEG 4.

The external memory interface 220 may be configured to connect to an external storage card such as a micro SD card, to expand a storage capability of the electronic device 200. The external storage card communicates with the processor 210 by using the external memory interface 220, so as to implement a data storage function. For example, a file, such as music or a video, is stored in the external storage card.

The internal memory 221 may be configured to store computer executable program code. The executable program code includes instructions. The processor 210 runs the instruction stored in the internal memory 221, to perform various function applications and data processing of the electronic device 200. The internal memory 221 may include a program storage area and a data storage area. The program storage region may store an operating system, an application required by at least one function (for example, a voice playing function or an image playing function), and the like. The data storage region may store data (for example, audio data and an address book) and the like created when the electronic device 200 is used. In addition, the internal memory 221 may include a high-speed random access memory, or may include a non-volatile memory such as at least one magnetic disk memory, a flash memory, or a universal flash storage (UFS).

The electronic device 200 may implement an audio function by using the audio module 270, the speaker 270A, the telephone receiver 270B, the microphone 270C, the headset jack 270D, the application processor, and the like, such as music playing or recording.

The audio module 270 is configured to convert digital audio information into an analog audio signal output, and is further configured to convert an analog audio input into a digital audio signal. The audio module 270 may be further configured to encode and decode an audio signal. In some embodiments, the audio module 270 may be disposed in the processor 210, or some function modules of the audio module 270 are disposed in the processor 210.

A software system of the electronic device 200 may use a layered architecture, an event-driven architecture, a microkernel architecture, a micro service architecture, or a cloud architecture. In this embodiment of this application, the software structure of the electronic device 200 is illustrated by using an Android system with a layered architecture as an example.

Figure 3:
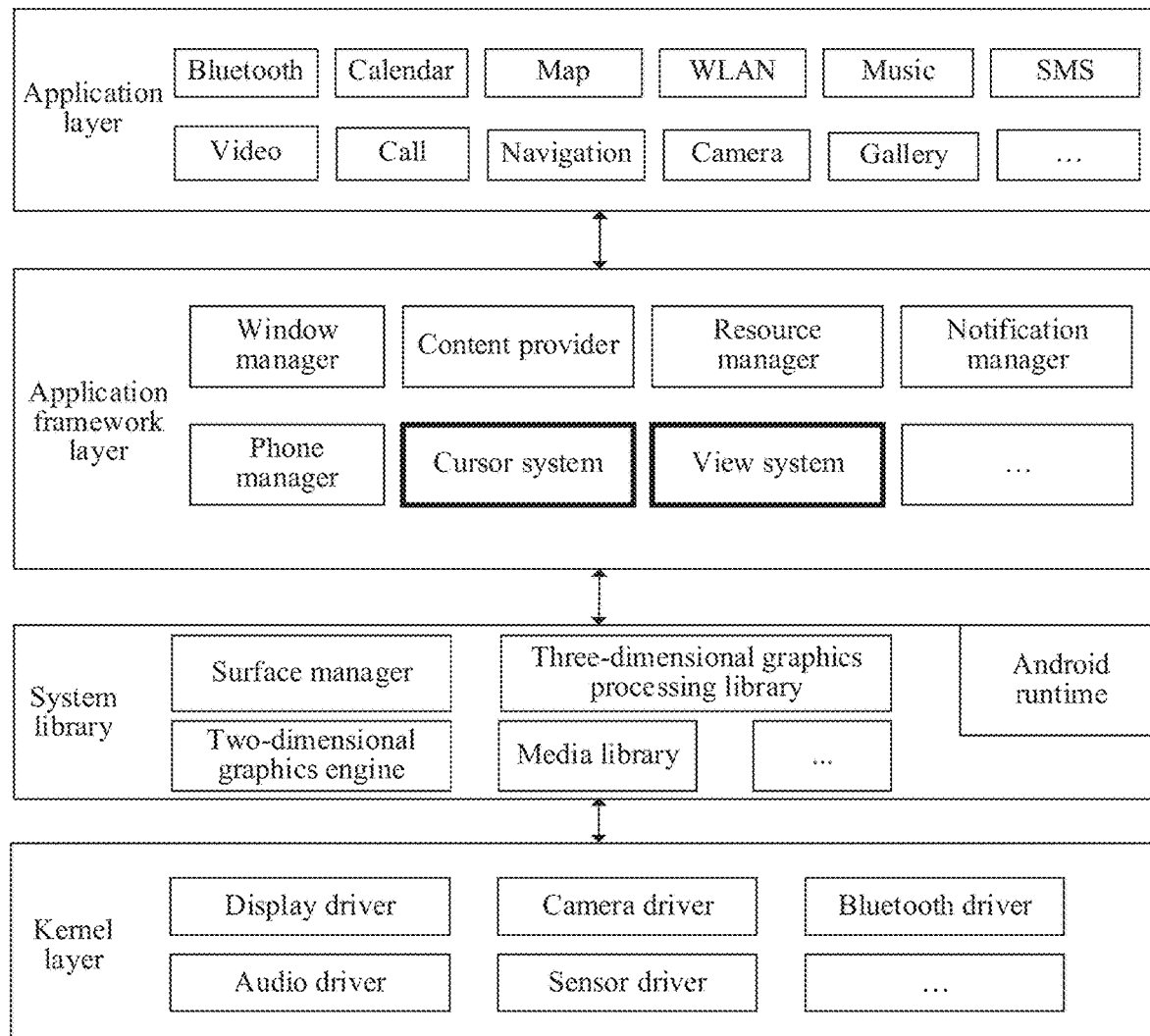
FIG. 3 exemplarily shows a schematic diagram of a software structure of an electronic device.

FIG. 3 is a block diagram of the software structure of the electronic device 200 in this embodiment of this application.

In the layered architecture of the electronic device 200, software is divided into several layers, and each layer has a clear role and task. Layers communicate with each other through a software interface. In some embodiments, the Android system is divided into four layers that are respectively an application layer, an application framework layer, an Android runtime and system library, and a kernel layer from top to bottom.

The application layer may include a series of application packages.

As shown in FIG. 3, the application packages may include applications such as camera, photos, calendar, phone, maps, navigation, WLAN, Bluetooth, music, videos, and SMS messages.

The application framework layer provides an application programming interface (API) and a programming framework for the applications at the application layer. The application framework layer includes some predefined functions.

As shown in FIG. 3, the application framework layer may include a window manager, a content provider, a view system, a phone manager, a resource manager, a notification manager, a cursor system, and the like.

The window manager is configured to manage a window application. The window manager may obtain a size of a display screen, determine whether there is a status bar, lock the screen, capture the screen, and the like.

The content provider is configured to store and obtain data, so that the data can be accessed by an application. The data may include a video, an image, an audio, calls made and answered, a browsing history and bookmarks, an address book, and the like.

The view system includes a visual control such as a control for text display or a control for picture display. The view system may be configured to construct an application. A display interface may be formed by one or more views. For example, a display interface including an SMS notification icon may include a view for displaying text and a view for displaying a picture. For example, in the embodiments of this application, the view system may further be configured to draw a cursor in a visual control, such as a bottom navigation control described below.

The cursor system is configured to draw and display the cursor in the embodiments of this application. The cursor system may display a cursor at a corresponding position on a display screen of the electronic device 200 according to a movement of an external device such as a mouse.

The phone manager is configured to provide a communication function of the electronic device 100, for example, call state management (including getting through, hang-up, and the like).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, the electronic device vibrates, or an indicator light flashes.

The Android Runtime includes a kernel library and a virtual machine. The Android runtime is responsible for scheduling and managing the Android system.

The kernel library includes two parts: One part is a performance function that the Java language needs to invoke, and the other part is a kernel library of Android.

The application layer and the application framework layer run on the virtual machine. The virtual machine executes Java files of the application layer and the application framework layer as binary files. The virtual machine is used to execute functions such as object lifecycle management, stack management, thread management, security and exception management, and garbage collection.

The system library may include a plurality of function modules, such as a surface manager, a media library, a three-dimensional graphics processing library (for example, OpenGL ES), and a 2D graphics engine (for example, SGL).

The surface manager is configured to manage a display subsystem, and converge 2D and 3D layers of a plurality of applications.

The media library supports playback and recording of a plurality of common audio and video formats, a static image file, and the like. The media library may support a plurality of audio and video encoding formats, for example, MPEG4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawings.

The kernel layer is a layer between hardware and software. The kernel layer includes at least a display drive, a camera drive, an audio drive, and a sensor drive.

It may be understood that components included in a system framework layer, a system library, and a runtime layer shown in FIG. 3 do not constitute a specific limitation on the electronic device 200. In some other embodiments of this application, the electronic device 200 may include more or fewer components than those shown in the figure, or some components may be combined, or some components may be split, or components are arranged in different manners.

Figure 4:
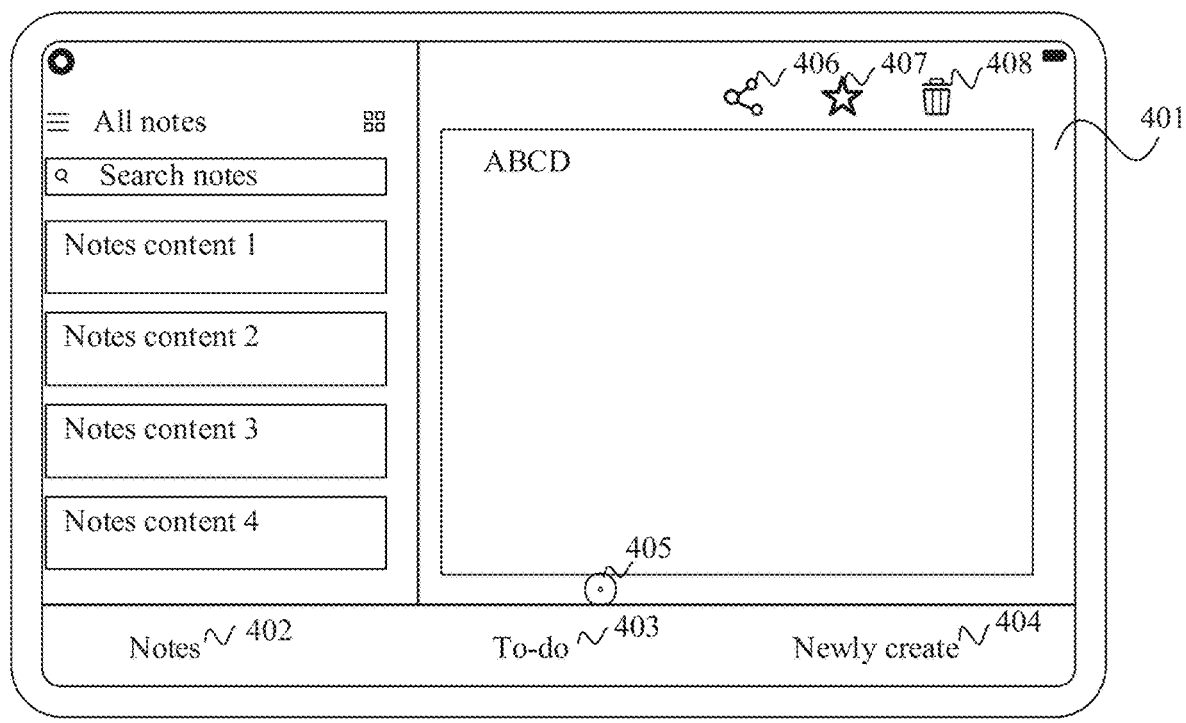
FIG. 4 exemplarily shows a schematic diagram displaying a cursor.

FIG. 4 exemplarily shows a schematic diagram of displaying a cursor. Referring to FIG. 4, for example, a display interface 401 of the tablet includes one or more controls. The controls include but are not limited to: a bottom navigation control and a top navigation control. For example, the bottom navigation control includes but is not limited to: a note control 402, a to-do control 403, and a newly created control 404. For example, the top navigation control includes but is not limited to: a sharing control 406, a favorite control 407, and a delete control 408. It should be noted that a quantity and a type of controls shown in the embodiments of this application are only illustrative examples, and are not limited in this application.

With reference to the application scenario shown in FIG. 1, in the embodiments of this application, the tablet is connected (communication connection) to a mouse, and a cursor 405 may be displayed on the display interface 401 of the tablet. The tablet may receive a control signal sent by the mouse through a Bluetooth connection with the mouse, so as to display the cursor 405 at a corresponding position on the display interface 401 based on the control signal. In addition, the tablet controls the cursor 405 to move along with the mouse. As described above, a cursor display solution in the embodiments of this application may further be applied to an application scenario in which the tablet is connected to the touchpad. In the scenario, the cursor may move according to a touch operation of the user on the touchpad. A specific implementation is similar to an implementation of the tablet and an implementation of the mouse in the embodiments of this application, and is not repeated in this application.

Figure 5A:
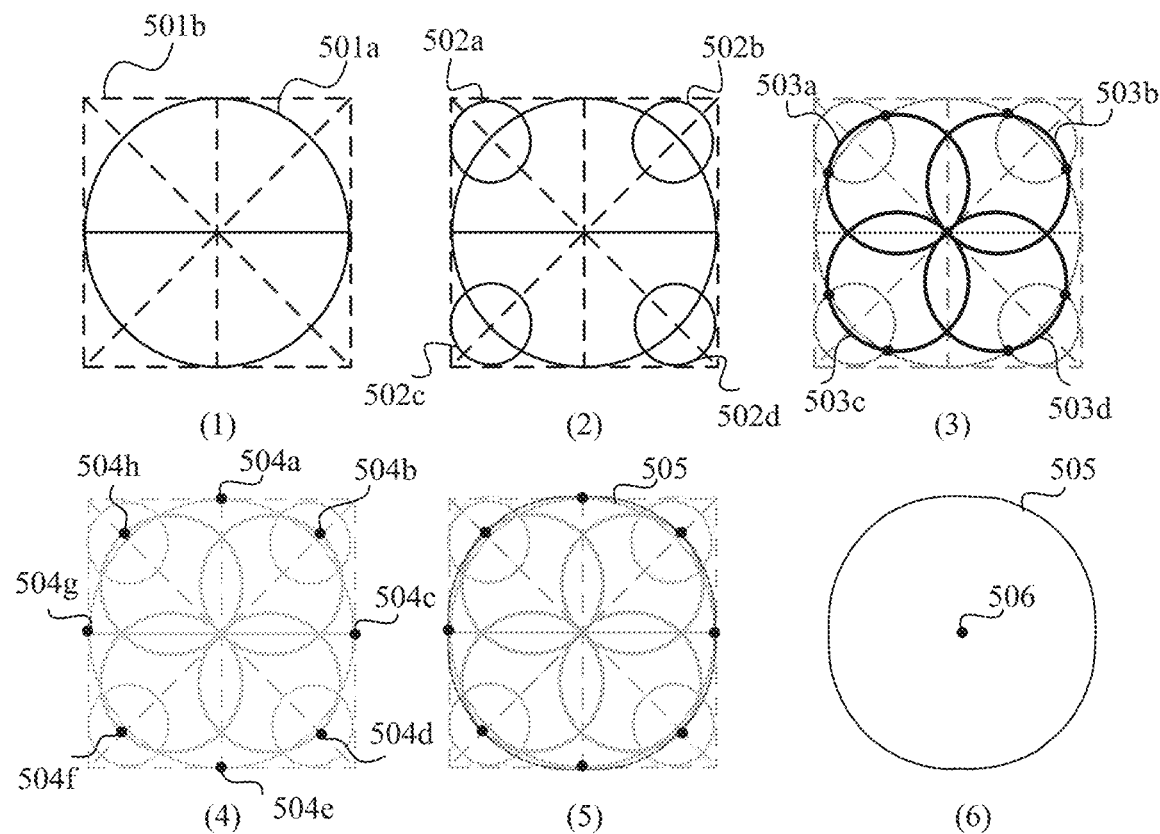
FIG. 5a to FIG. 5b exemplarily show a schematic diagram displaying a cursor.

For example, in the embodiments of this application, the tablet (such as the cursor system shown in FIG. 3) may draw the cursor, and the cursor that is drawn is displayed on the display interface of the tablet, such as the cursor 405 shown in FIG. 4. FIG. 5a exemplarily shows a schematic diagram of drawing a cursor. Referring to (1) in FIG. 5a, for example, the cursor system draws a circle 501a based on a square 501b. A geometric center of the circle 501 is aligned with a geometric center of the square 501b. That is, an intersection of diagonals of the square is a center of the circle 501. Referring to (2) in FIG. 5a, for example, the cursor system may draw the circle 502a to a circle 502d based on an intersection of two diagonals between the circle 501a and the square 501b. Four intersections of diagonals between the circle 501a and the square 501b are respectively centers of the circle 502a to the circle 502d. In addition, a distance between the intersection and a frame of the square 501 closest to the intersection is a radius of the circle. Referring to (3) in FIG. 5a, for example, the cursor system may draw a circle 503a based on intersections between the circle 501a and the circle 502a and the center of the circle 501a. The two intersections between the circle 501a and the circle 502a and the center of the circle 501a are all located on a side of the circle 503a. Based on the manner, the cursor system draws a circle 503b to a circle 503d. Referring to (4) in FIG. 5a, for example, the cursor system obtains intersections of diagonals between the circle 503a to the circle 503d and the square 501b, including: 504b, 504d, 504f, and 504h. In addition, the cursor system obtains intersections between the circle 501a and the square 501b, including: 504a, 504c, 504e, and 504g. Referring to (5) in FIG. 5a, for example, the cursor system draws a cursor 505 by changing a curvature of the circle 501a based on 501a and obtained intersections 504a to 504h. For example, the cursor 505 drawn by the cursor system is shown in (6) in FIG. 5a. Optionally, the cursor 505 may be referred to as a round rectangle. Referring to (6) in FIG. 5a, for example, the cursor 505 further includes a cursor center 506. For example, the cursor center 506 is used for representing a position of the cursor, which may also be understood as an actual position of the cursor. That is, in the embodiments of this application, the cursor center 506 is used for indicating a corresponding actual position (or coordinates) of the mouse on the display interface. The cursor 505 may be configured to highlight a position of the cursor, so that the position of the cursor is more obvious, and it is convenient for the user to control the position of the cursor through the mouse.

Continuing to refer to (6) in FIG. 5a, for example, a circumference of the cursor 505 is greater than a circumference of the circle 501a shown in (1) in FIG. 5a, that is, $2\pi r$. r is a radius of the circle 501. The circumference of the cursor 505 is less than a circumference of the square 501b shown in (1) in FIG. 5a, that is, 8 r.

Figure 5B:
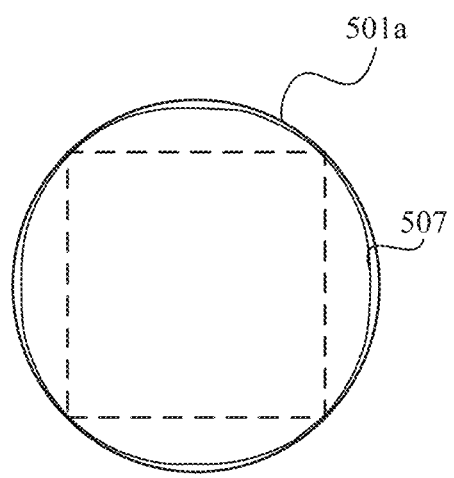

In another possible implementation, referring to FIG. 5b, for example, a cursor 507 is in a shape of a round rectangle whose circumference is greater than a circumference of an inscribed square of the circle 501a shown in (1) in FIG. 5a, that is, $4\sqrt{2}r$, where r is the radius of the circle 501. In addition, the circumference of the cursor 507 is less than the circumference of the circle 501a shown in (1) in FIG. 5a, that is, $2\pi r$.

Figure 6:
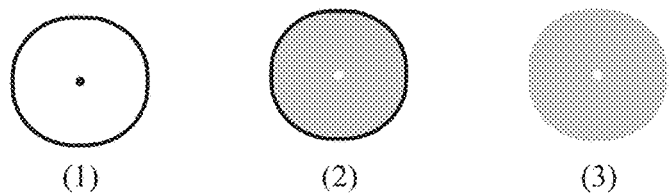
FIG. 6 exemplarily shows a schematic diagram displaying a cursor.

For example, referring to (1) in FIG. 6, for example, the cursor center is optionally black, and an edge of the cursor is black. A fill color of the cursor is white. Optionally, transparency of the cursor is 80%. Transparency of the edge of the cursor is 60%. Transparency of the cursor center is 0. The cursor center is located at the geometric center of the cursor.

Referring to (2) in FIG. 6, for example, the cursor center is optionally white, and the transparency of the cursor center is 20%. The fill color of the cursor is gray, and the transparency of the cursor is 60%. The edge of the cursor is black, and the transparency of the edge of the cursor is 60%.

Referring to (3) in FIG. 6, for example, the cursor center is optionally white, and the transparency of the cursor center is 0. The fill color of the cursor is gray, and the transparency of the cursor is 60%. The edge of the cursor is gray, and the transparency of the edge of the cursor is 100%.

It should be noted that the cursor in FIG. 6 is only an illustrative example. Any combination of the transparency of the cursor, a color of the edge of the cursor, the transparency of the edge of the cursor, a thickness of the edge of the cursor, a size of the cursor center 406, a shape of the cursor center 406, a color of the cursor center 406, the transparency of the cursor center 406, and the position of the cursor center 406 in the cursor 405 is within a protection scope of this application. Further, it should be noted that the cursor system may display different cursors based on a brightness of the display interface, an application displayed on the display interface, and/or a background color of the display interface. For example, when a memo application is displayed on the display interface, the cursor may be as shown in (1) in FIG. 6. For example, when a game application is displayed on the display interface, the cursor may be as shown in (2) in FIG. 6. For example, when the background color of the display interface is black, the cursor may be as shown in (1) in FIG. 6. For example, when the background color of the display interface is white, the cursor may be as shown in (3) in FIG. 6.

For example, in the embodiments of this application, each control on the display interface includes a hot zone. When the cursor moves to the hot zone of the control, the view system starts to draw the cursor in the hot zone of the control to implement an adsorption effect, so that the user precisely controls the control based on the adsorption effect between the cursor and the control.

Figure 7:
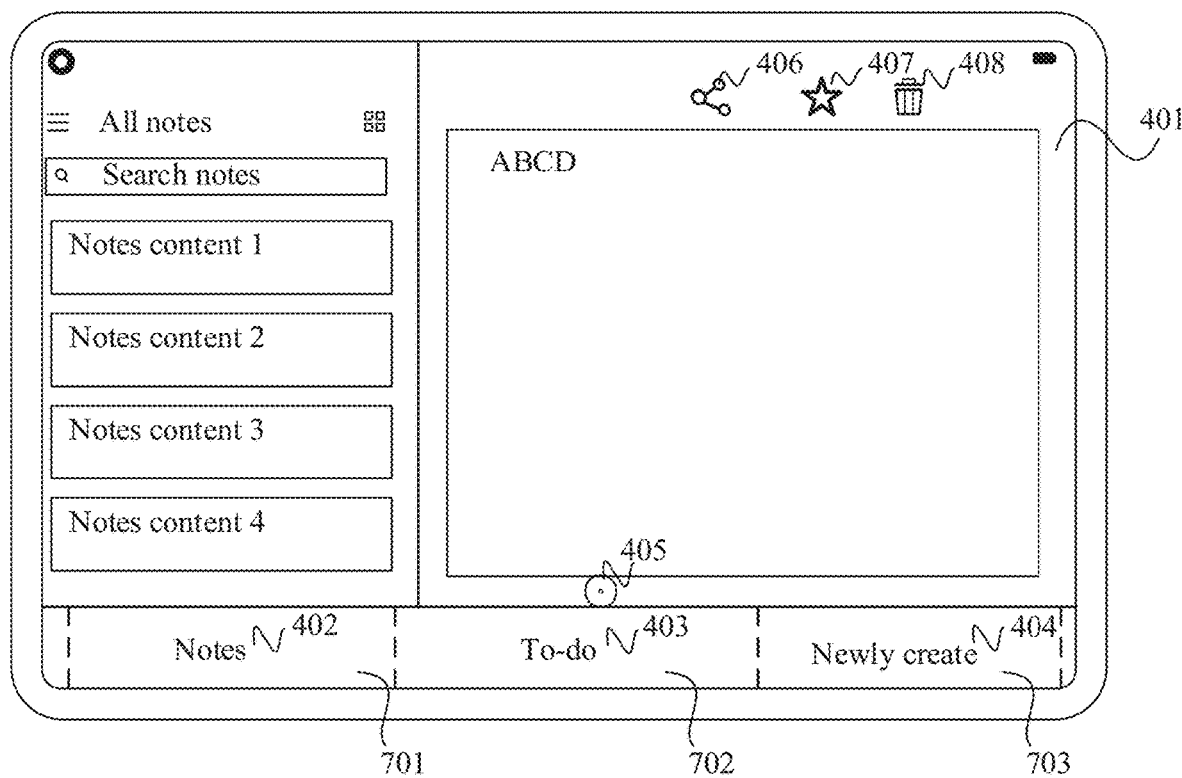
FIG. 7 exemplarily shows a schematic diagram of a hot zone of a control.

FIG. 7 exemplarily shows a schematic diagram of a hot zone of a control. Referring to FIG. 7, for example, the display interface 401 includes a hot zone 701 of the note control 402, a hot zone 702 of the to-do control 403, and a hot zone 703 of the newly created control 404.

It should be noted that in this embodiment, only the hot zone of the control is used as an example for description. A drawing manner of the cursor in the hot zone in the embodiments of this application may be applied to any control on the display interface, which is not repeated again in this application.

Further, it should be noted that a size and a position of the hot zone shown in FIG. 7 are only illustrative examples, and are not limited in this application.

Further, it should be noted that a shape and a size of the hot zone of each control on the display interface may be the same or different, which is not limited in this application.

Further, it should be noted that in the embodiments of this application, a concept of the hot zone is only an example for description. Actually, the hot zone is invisible from the perspective of the user.

Continuing to refer to FIG. 7, in the embodiments of this application, an example in which the user controls the movement of the mouse, so that the cursor 405 moves from the position shown in FIG. 7 to the hot zone of the to-do control 403 is used for description. It should be noted that accompanying drawings in the following embodiments only show the tablet, but not the mouse connected to the tablet. In fact, in the following embodiments, the user may control the cursor through the mouse connected to the tablet.

Figure 8A:
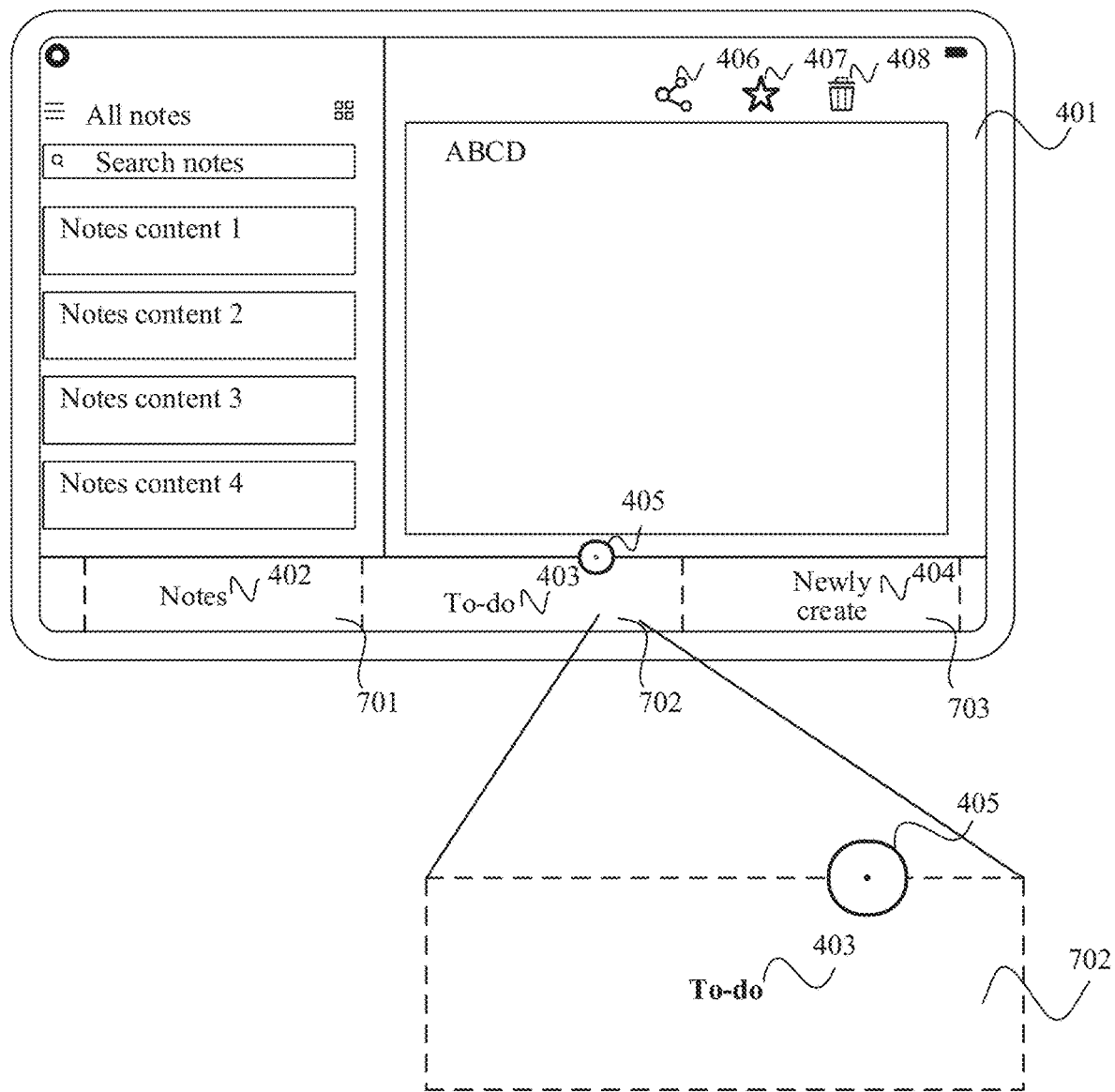
FIG. 8a to FIG. 8c exemplarily show a schematic diagram displaying a cursor.
Figure 8B:
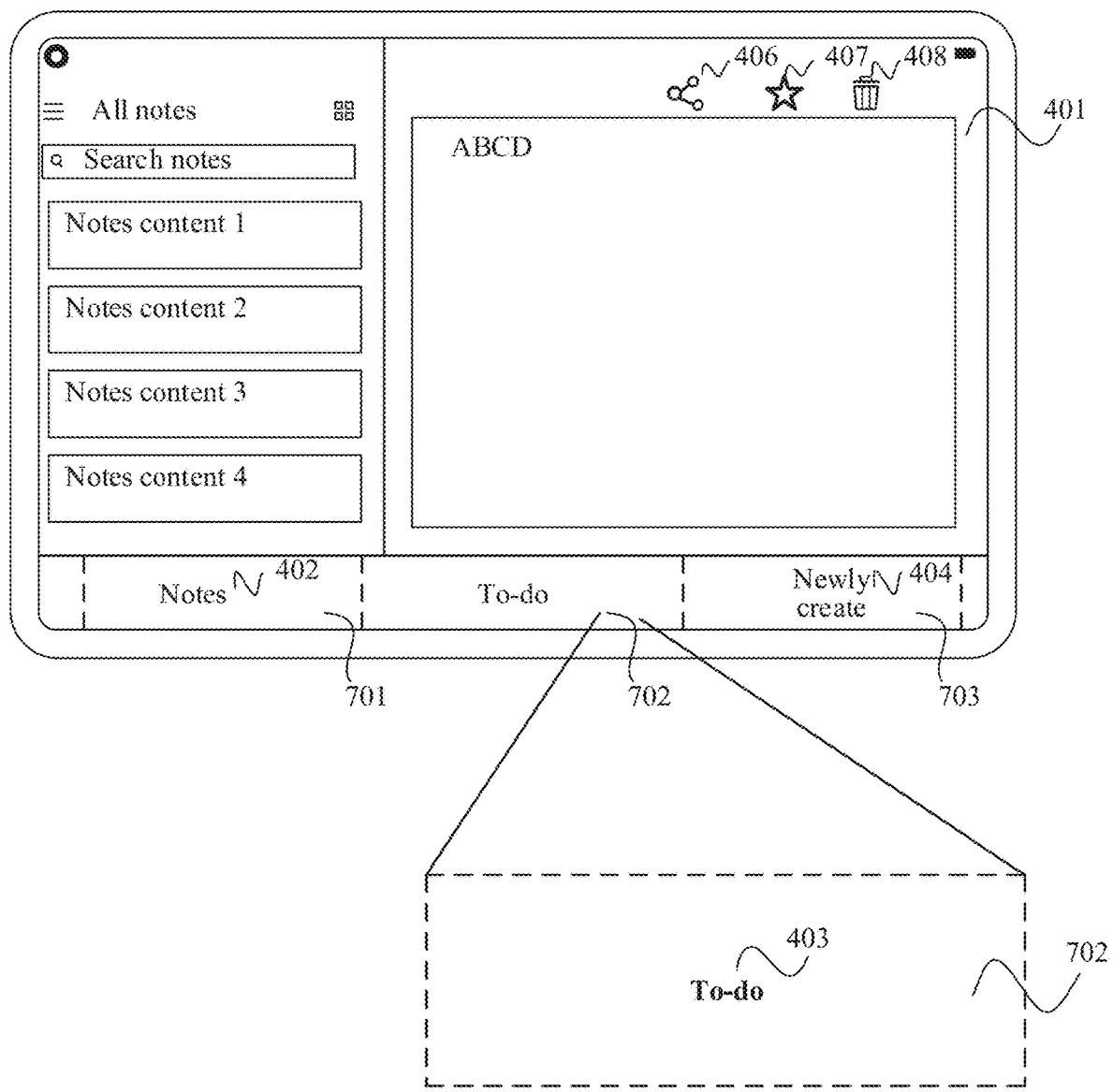
Figure 8C:
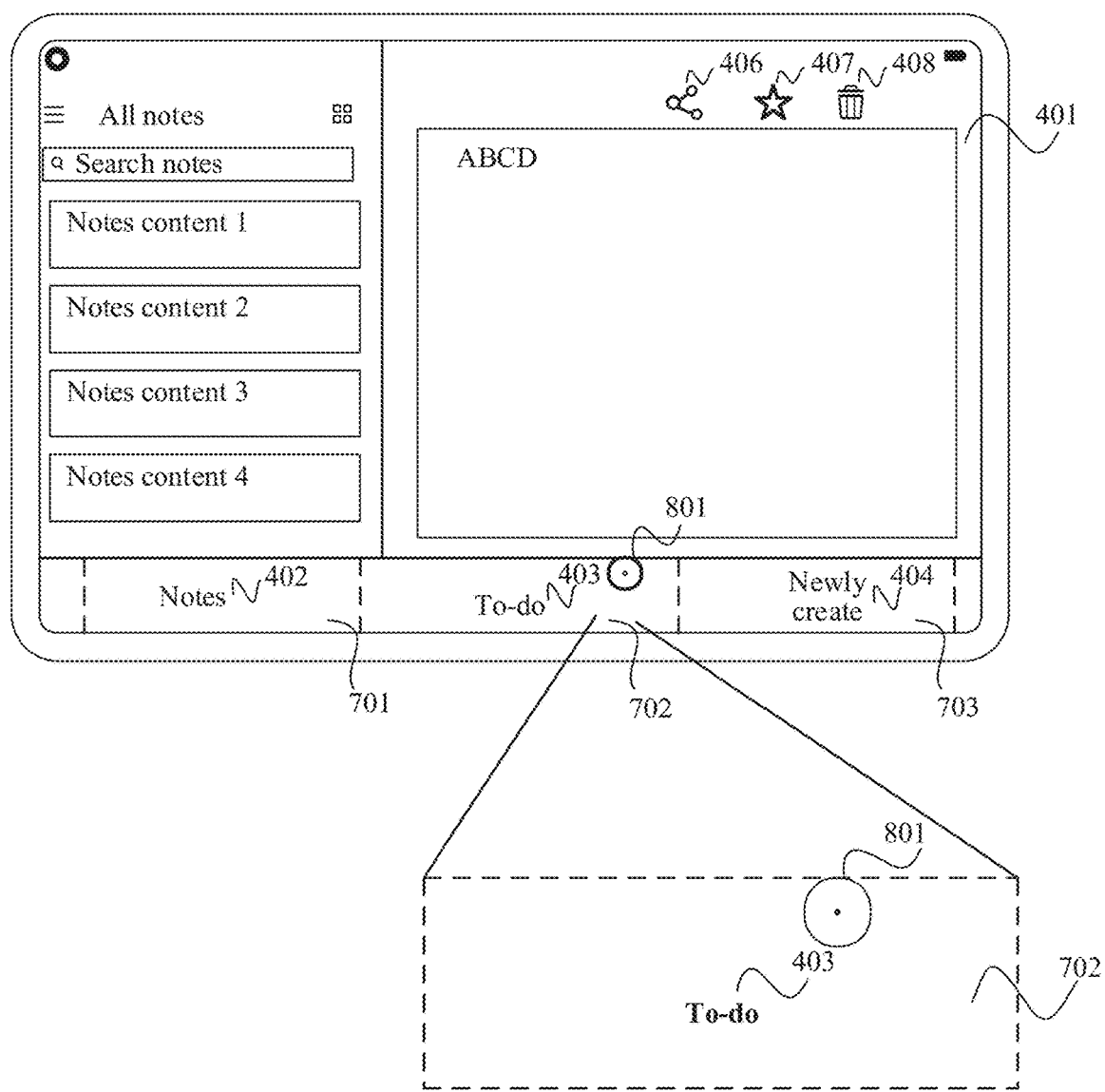

For example, the user continues to move the mouse, so that the cursor 405 moves to the hot zone 702 of the to-do control 403 following the mouse. Referring to FIG. 8a, for example, the cursor 405 moves to an edge of the hot zone 702 following the mouse, where the cursor center of the cursor 405 moves to a frame of the hot zone 702. Referring to FIG. 8b, for example, after the cursor system detects that the cursor center moves to the frame of the hot zone 702, displaying of the cursor 405 is canceled. Referring to FIG. 8c, for example, after the cursor system cancels displaying of the cursor 405, the view system redraws the cursor in the hot zone 702, that is, a cursor 801 in FIG. 8c. That is, from the perspective of the user, a dynamic effect of the cursor 405 viewed by the user is that the cursor 405 moves to an edge of the to-do control 403 and then disappears. After disappearing, the cursor 405 jumps to the to-do control 403 for display. It should be noted that a shape and a size of the cursor 801 are example descriptions. The shape and the size of the redrawn cursor 801 in the hot zone 702 may or may not be the same as that of the cursor 405. Specific examples will be described in detail in the following embodiments.

For example, in the embodiments of this application, positions in the hot zone of the control to which the cursor 405 may move from the edge of the hot zone of the control (for example, the to-do control 403) may include a plurality of types. Optionally, the view system may determine a position in the hot zone at which the cursor jumps based on a direction in which the cursor moves. Optionally, the view system may determine a position in the hot zone at which the cursor jumps based on a specified direction. Optionally, the view system may further enable the cursor to jump at any position in the hot zone close to the edge of the hot zone, which is not limited in this application.

Figure 9A:
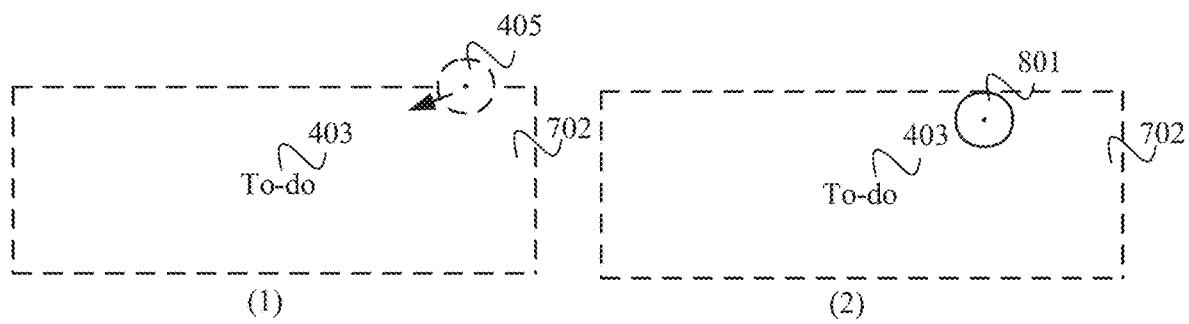
FIG. 9a to FIG. 9b exemplarily show a schematic diagram displaying a cursor.

For example, FIG. 9a exemplarily shows a schematic diagram of a jumping position of a cursor. Referring to (1) in FIG. 9a, for example, the cursor center of the cursor 405 moves to the edge of the hot zone 702, and the view system obtains a movement direction of the cursor 405, which is shown by an arrow in (1) in FIG. 9a. For example, as described above, after the cursor 407 moves to the edge of the hot zone, the cursor 801 disappears. Referring to (2) in FIG. 9a, for example, the view system may determine a position of the cursor 405 displayed in the hot zone 702 based on the movement direction of the cursor 405, redraw the cursor in the hot zone 702, and display the cursor 801. That is, in (2) in FIG. 9a, the position in the hot zone 702 at which the cursor 801 jumps is determined based on the movement direction of the cursor 405. Optionally, a position of the cursor 801 is in the movement direction of the cursor 405, and the cursor 801 is at a position closest to the edge of the hot zone 702 in the movement direction of the cursor 405.

Figure 9B:
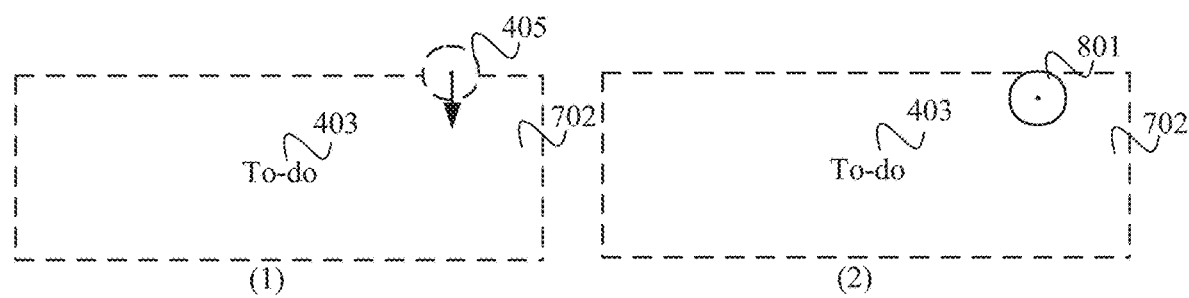

FIG. 9b exemplarily shows a schematic diagram of another jumping position of a cursor. Referring to (1) in FIG. 9b, for example, the cursor center of the cursor 405 moves to the edge of the hot zone 702, and the cursor 405 disappears. Referring to (2) in FIG. 9b, for example, after the cursor 405 disappears, the view system redraws the cursor in the hot zone 702, and displays the cursor 801 drawn in the hot zone 702. For example, a position at which the cursor 801 is located is directly below the cursor 405 (that is, on an extension line in a vertical direction), and is closest to a position of the edge of the hot zone 702. That is, the view system does not need to refer to the movement direction of the cursor, but only determines the position of the cursor after the cursor jumps to the hot zone according to a specified direction (such as directly below). It should be noted that in the embodiments of this application, a description is made by using an example in which only the specified direction is directly below. In other embodiments, the view system may determine the position of the cursor after the cursor jumps to the hot zone based on any specified direction (for example, 40° obliquely downward, or the like, which may be set according to actual needs, and is not limited in this application). For example, if the cursor is located at an upper edge or a lower edge of the control before disappearing, the set direction may be the vertical direction. If the cursor is located at a left edge or a right edge of the control before disappearing, the set direction may be the horizontal direction. This is not limited in this application.

Further, it should be noted that in the embodiments of this application, a description is made by using an example in which the position in the hot zone at which the cursor jumps is close to the edge of the hot zone is used. In other embodiments, there may be a specified distance between the position in the hot zone at which the cursor jumps and the edge of the hot zone (for example, 3 mm, which may be set according to actual needs, and is not limited in this application).

Figure 10:
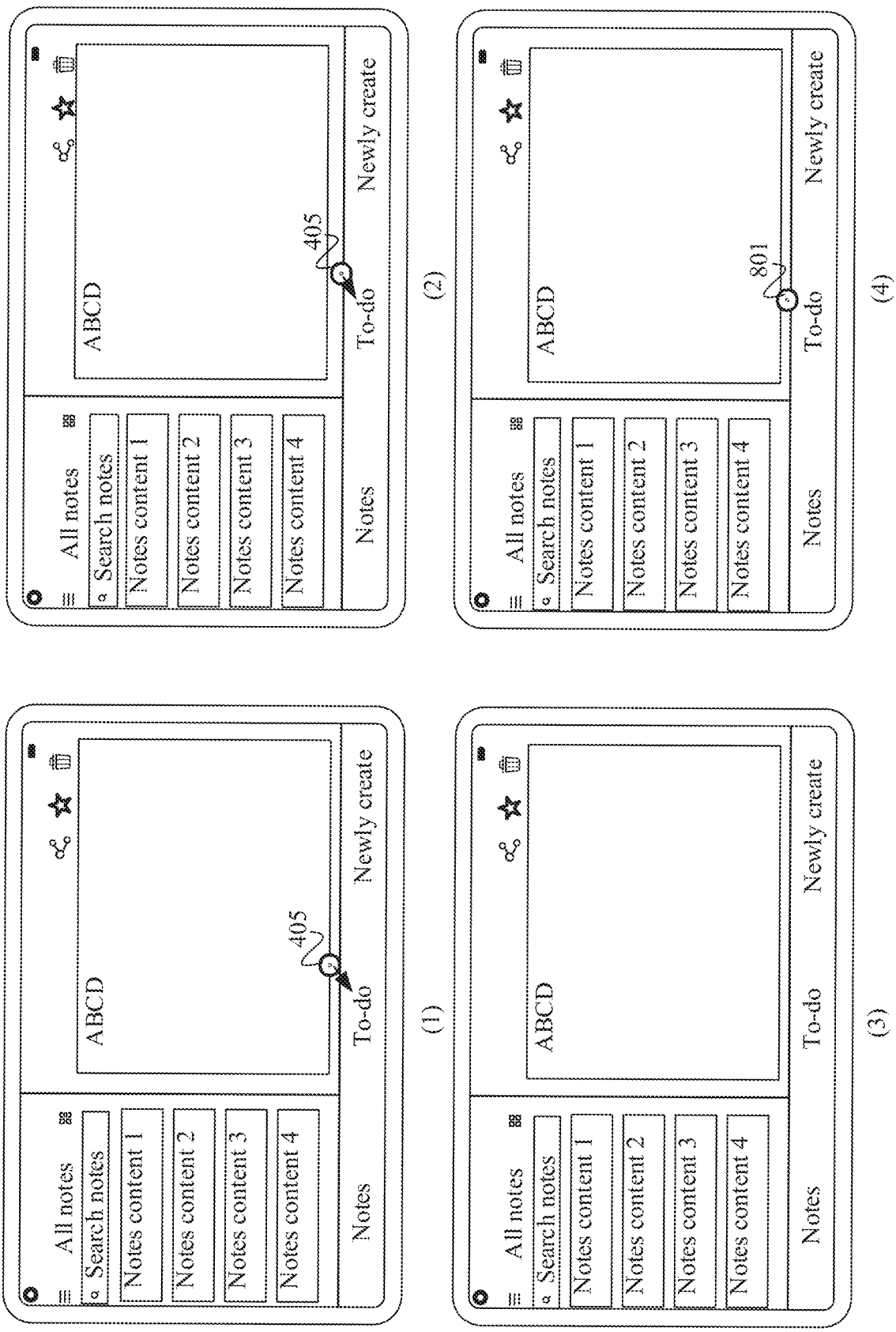
FIG. 10 exemplarily shows a schematic diagram of a jumping process of a cursor.

FIG. 10 exemplarily shows a schematic diagram of a jumping process of a cursor based on FIG. 9a. Referring to (1) in FIG. 10, for example, the cursor 405 moves toward the to-do control. Referring to (2) in FIG. 10, for example, the cursor center of the cursor 405 moves to an edge of the to-do control (that is, the edge of the hot zone of the to-do control). Referring to (3) in FIG. 10, the cursor 405 disappears. Referring to (3) in FIG. 10, for example, the cursor jumps into the to-do control, that is, the cursor 801 is displayed in the to-do control. Optionally, a position of the cursor 801 is in the movement direction of the cursor 405, and is closest to the position of the edge of the hot zone 702 (for example, an upper frame of the hot zone 702).

For example, in the embodiments of this application, after the cursor jumps into the hot zone of the control, the view system may draw the cursor in the hot zone of the control to implement a deformation effect, so that a deformed cursor covers the hot zone of the control.

Figure 11A:
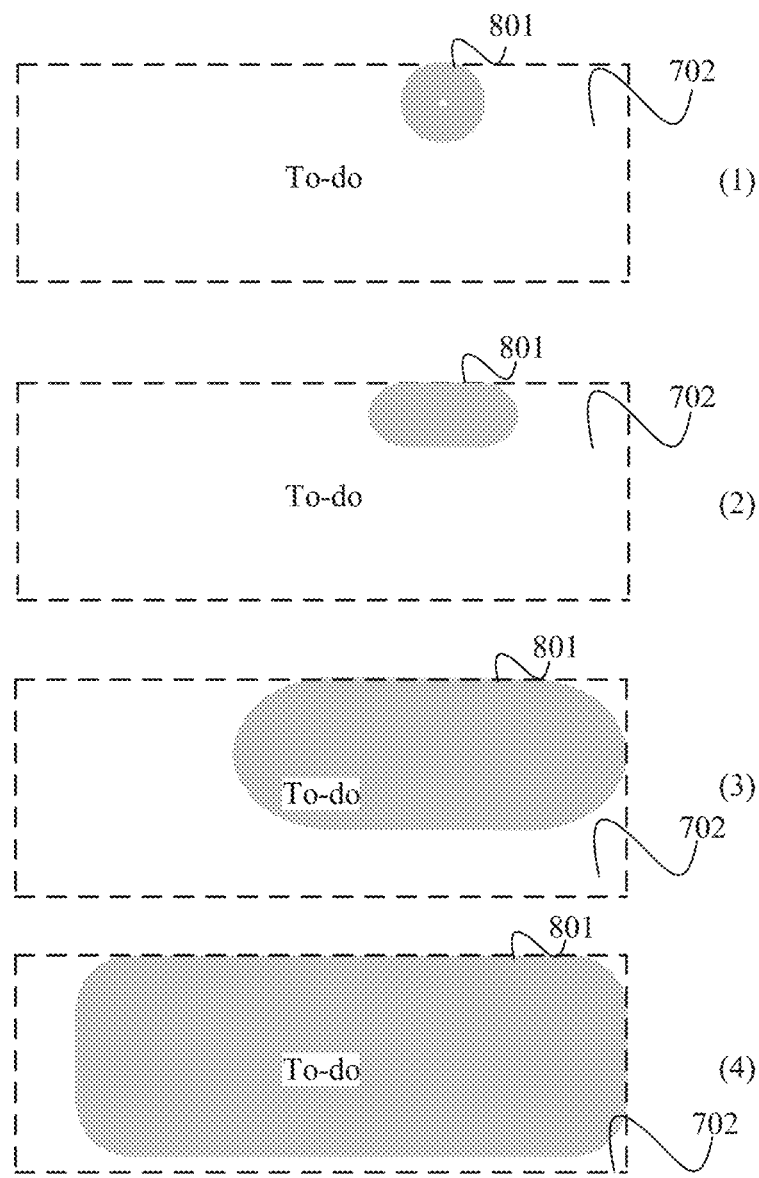
FIG. 11a to FIG. 11b exemplarily show a schematic diagram displaying a cursor.

For example, FIG. 11a exemplarily shows a schematic diagram of cursor deformation. Referring to (1) in FIG. 11a, for example, the view system draws the cursor 801 in the hot zone. Optionally, what is drawn in the hot zone may also be referred to as a mask. In a process of cursor deformation shown in FIG. 11a, the cursor starts to deform from an original shape of the cursor. That is, after the cursor jumps to the hot zone 702, a shape of the cursor 801 drawn by the view system in the hot zone 702 is the same as the original shape of the cursor, that is, a shape and a size of the shape (such as the cursor 405) before the cursor jumps to the hot zone 702.

Referring to (2) in FIG. 11, for example, the view system changes the cursor from the shape and the size of the cursor 801, the cursor center (and the frame of the cursor) disappears, and the cursor 801 is gradually enlarged and deformed. In the embodiments of this application, a description is made by using an example in which the view system deforms the cursor 801 to approximate a shape (that is, a rectangle) of the hot zone 702. That is, the view system gradually enlarges and deforms the cursor 801 to approximate the shape of the hot zone 702. The "approximate" in the embodiments of this application may optionally indicate that the cursor 801 is deformed into a shape of a rectangle (that is, the hot zone 702), and a ratio of a length to a height is the same as that of the hot zone 702, and four deformed vertices are rounded vertices.

Referring to (3) in FIG. 11, for example, in a process in which the view system gradually enlarges and deforms the cursor 801, if any frame of the cursor 801 touches a border of the hot zone 702 (that is, the frame), the cursor stops expanding in the direction, and continues to expand in another direction until the cursor 801 is enlarged to 95% of an area of the hot zone 702 (which may be set according to actual needs, and is not limited in this application), as shown in (4) in FIG. 11a. Referring to (4) in FIG. 11a, for example, the shape of the cursor 801 approximates the shape of the hot zone 702 (for the concept, reference may be made to the above). For example, an area of the cursor 801 occupies 95% of the area of the hot zone 702.

Figure 11B:
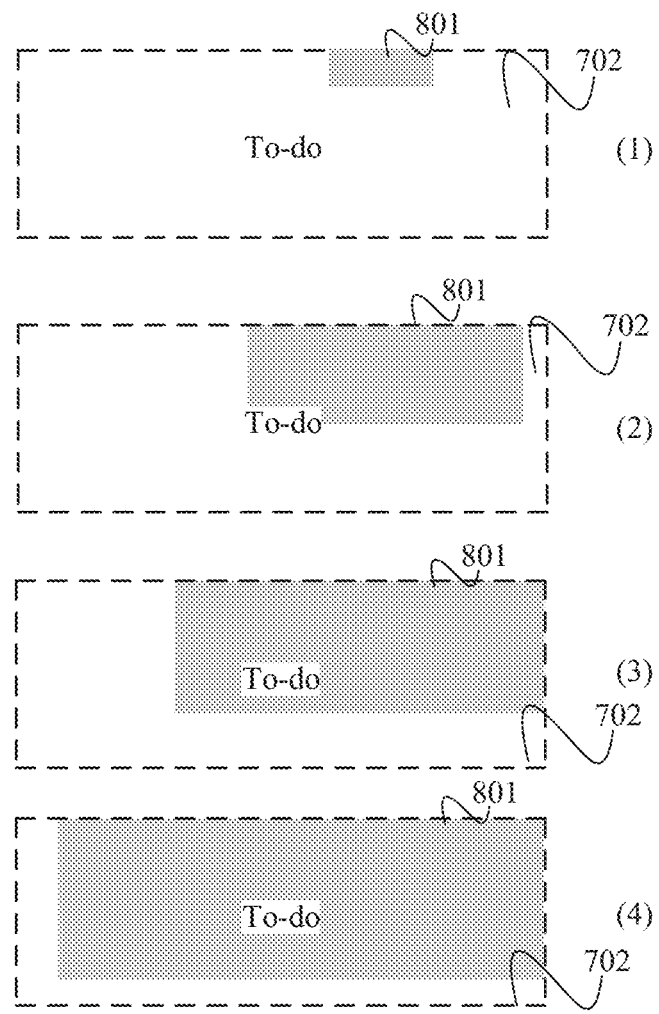

FIG. 11b exemplarily shows a schematic diagram of another cursor deformation. Referring to (1) in FIG. 11b, for example, the cursor 405 jumps into the hot zone 702, and the view system may draw the cursor 801 in the hot zone 702. The shape of the cursor 801 may be the same as the shape of the hot zone 702, for example, may also be a rectangle. That is, the view system starts to draw the cursor from a shape of a rectangle of the cursor 801, and gradually enlarges the cursor 801 in the hot zone 702. It may be understood that in this embodiment, the cursor 801 is only gradually enlarged without being deformed. In the process shown in FIG. 11a, the cursor needs to be gradually enlarged from the original shape and be deformed to a preset shape, such as a rectangle with four rounded corners. Referring to (2) in FIG. 11b, as described above, the view system gradually enlarges the cursor 801 according to the current shape, that is, the same rectangle as the hot zone 702. Referring to (3) in FIG. 11b, similar to the above, in a process in which the cursor 801 is enlarged, if any frame of the cursor 801 touches the frame of the hot zone 702, enlargement in the direction is stopped, and other frames continue to be enlarged. Referring to (4) in FIG. 11b, for example, the cursor 801 continues to be enlarged until the area accounts for 95% of the area of the hot zone 702, and enlargement is stopped.

It should be noted that shapes in FIG. 11a and FIG. 11b are only illustrative examples. In other embodiments, the cursor may be gradually enlarged and deformed from the original shape to a circle or another polygon in the hot zone 702. Alternatively, the cursor may further be gradually enlarged and deformed from another preset shape (such as a square or an oval) in the hot zone 702 to the figure shown in (4) in FIG. 11a, or be enlarged and deformed to the figure shown in (4) in FIG. 11b, or may further be enlarged and deformed to another shape, which is not limited in this application.

Further, it should be noted that in a process of cursor deformation shown in FIG. 11a and FIG. 11b, the actual position of the cursor remains unchanged, that is, the position of the cursor 801 in (1) in FIG. 11a is used as an example for description. In other embodiments, if the cursor 801 is in the process of deformation, the actual position of the cursor moves in the hot zone 702 along with the mouse, then the cursor 801 simultaneously offsets in the hot zone 702 along with the actual position of the cursor in the process of deformation. For a specific offset manner, reference may be made to a cursor pulling process shown in FIG. 13a and FIG. 13b below.

Figure 12A:
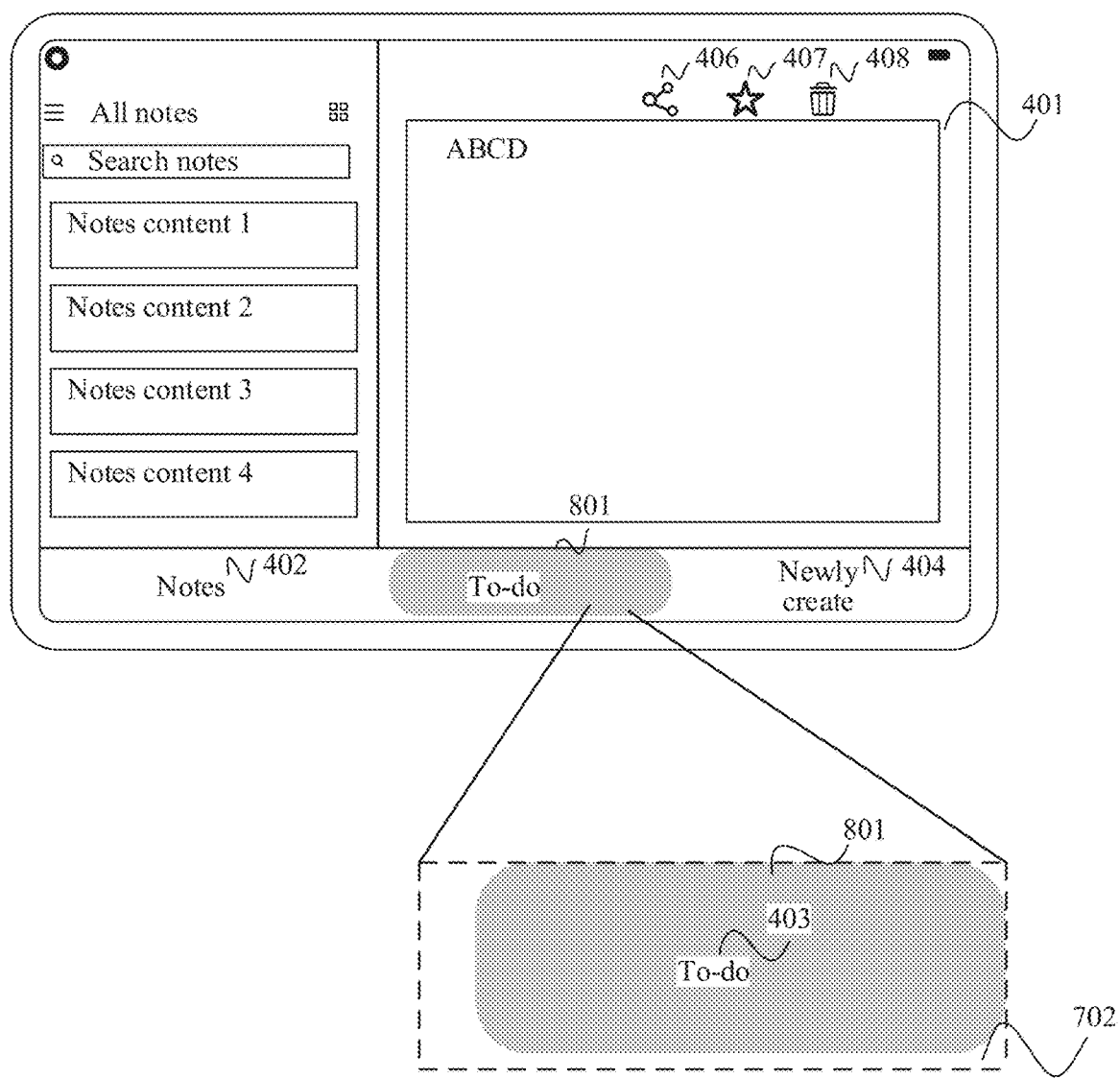
FIG. 12a to FIG. 12b exemplarily show a schematic diagram displaying a cursor.

FIG. 12a exemplarily shows a schematic diagram of cursor deformation. Referring to FIG. 12a, for example, from the perspective of the user, a deformed shape of the cursor 801 approximates a shape of the hot zone 702, and the four corners are rounded corners. In addition, an area of the cursor 801 occupies 95% of the area of the hot zone 702.

It should be noted that the position of the cursor 801 shown in FIG. 12*a* is close to an upper frame and a right frame of the hot zone 702. The position is determined based on the position of the cursor center (also referred to as the actual position of the cursor). That is, in the embodiments of this application, although the cursor center is invisible from the perspective of the user, the actual position of the cursor center may be reflected by position change of the cursor 801. The user may determine the movement direction of the cursor by the position change of the cursor 801. That is, the view system moves the cursor 801 along with the cursor center, that is, the movement of the mouse, so as to implement a pulling effect on the cursor 801. A specific pulling manner will be described in detail in the following embodiments.

Figure 12B:
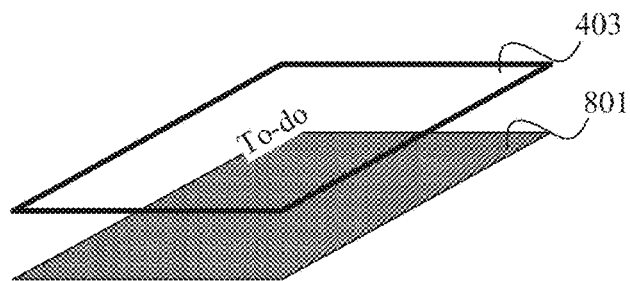

FIG. 12*b* exemplarily shows a schematic diagram of positions of a control and a cursor. Referring to FIG. 12*b*, for example, in the embodiments of this application, the to-do control 403 is located above the cursor 801. That is, a color and a shape of the cursor 801 do not affect a font color and a background color of the to-do control 403. For example, if the font color of the to-do control 403 is blue, when the cursor 801 is superposed below the to-do control 403, a font of the to-do control 403 still displays an original color, that is, blue. That is, superposition of the cursor 801 does not change the font color of the to-do control.

Figure 13A:
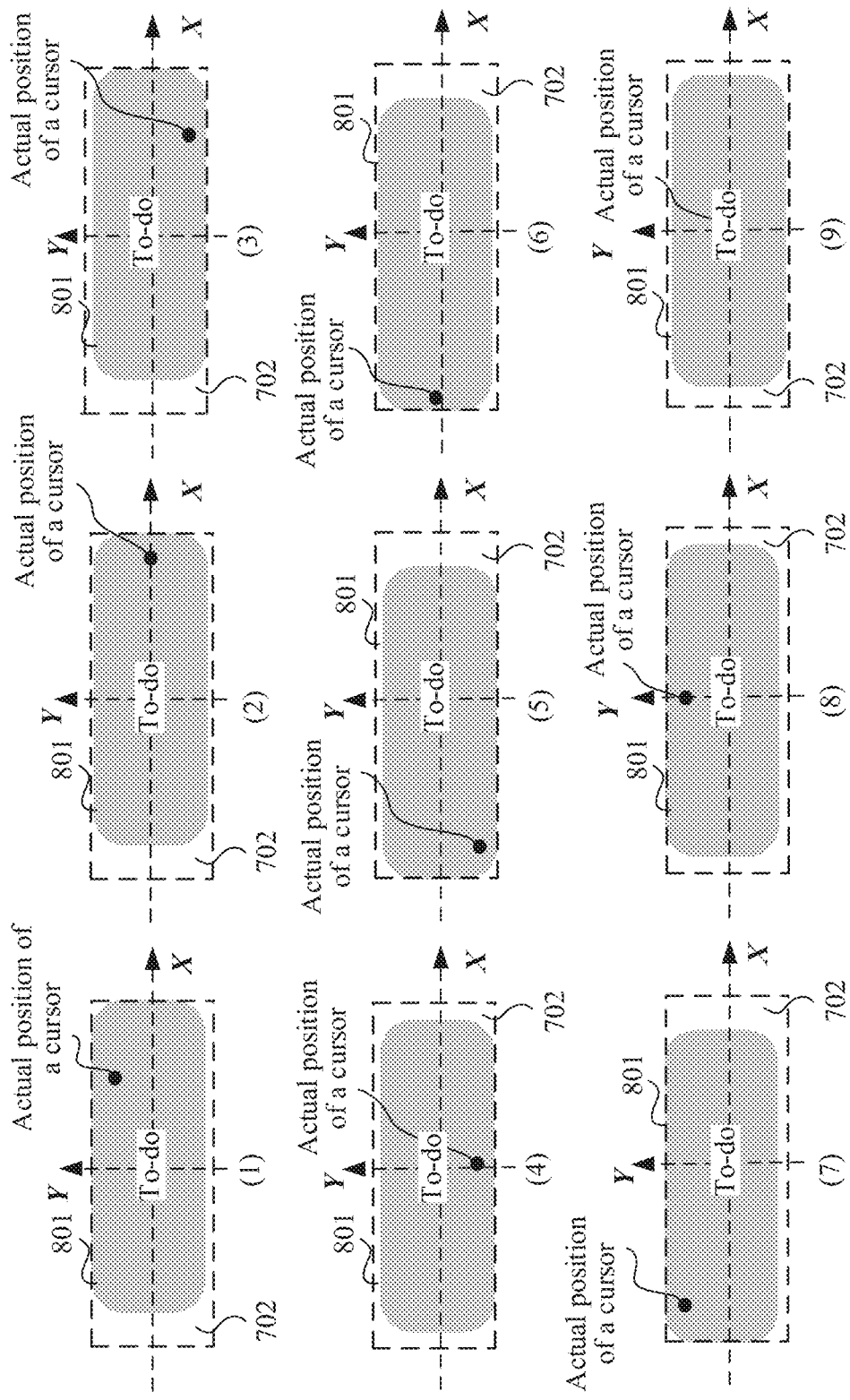
FIG. 13a to FIG. 13c exemplarily show a schematic diagram displaying a cursor.
Figure 13B:
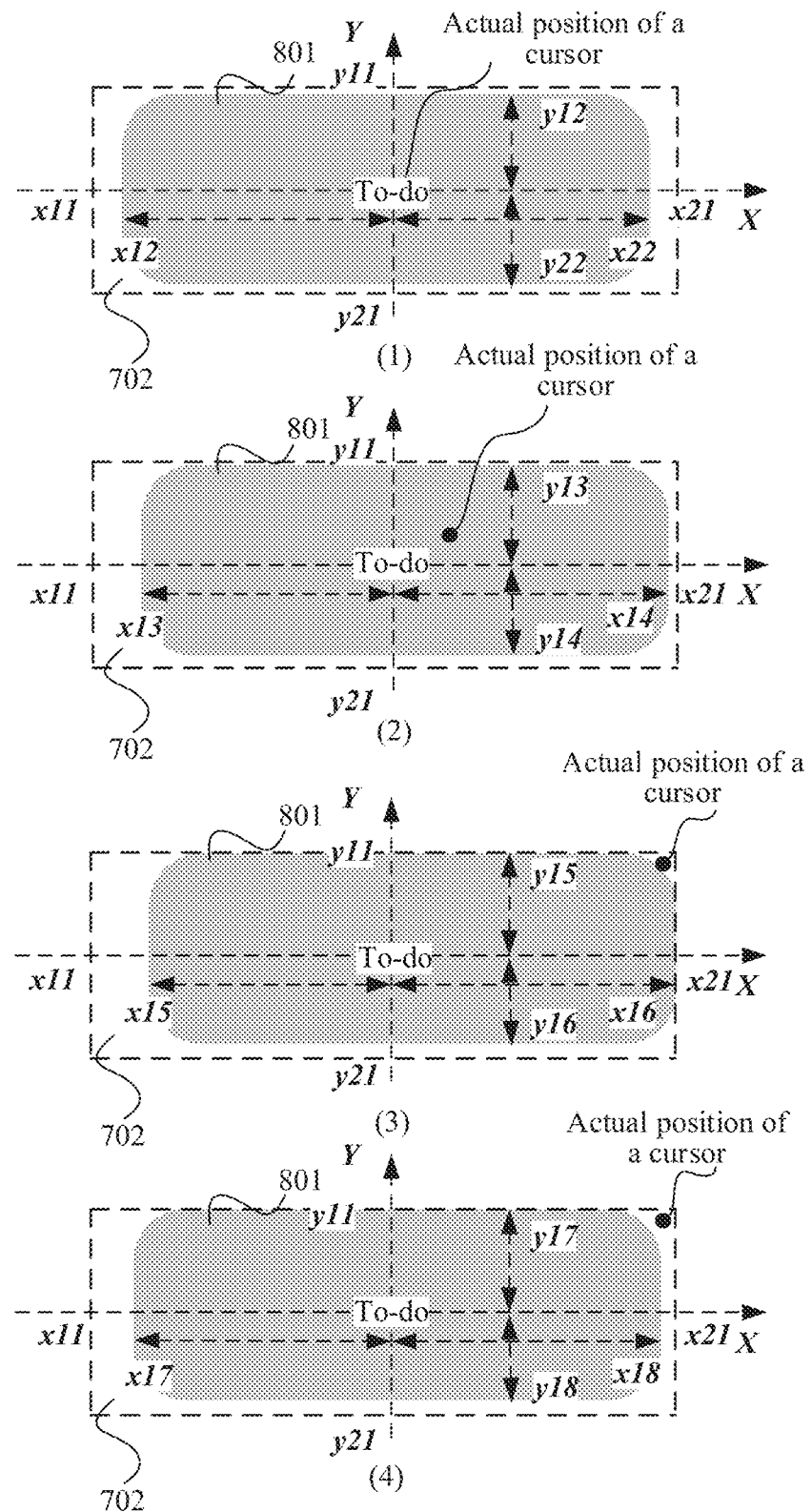
Figure 13C:
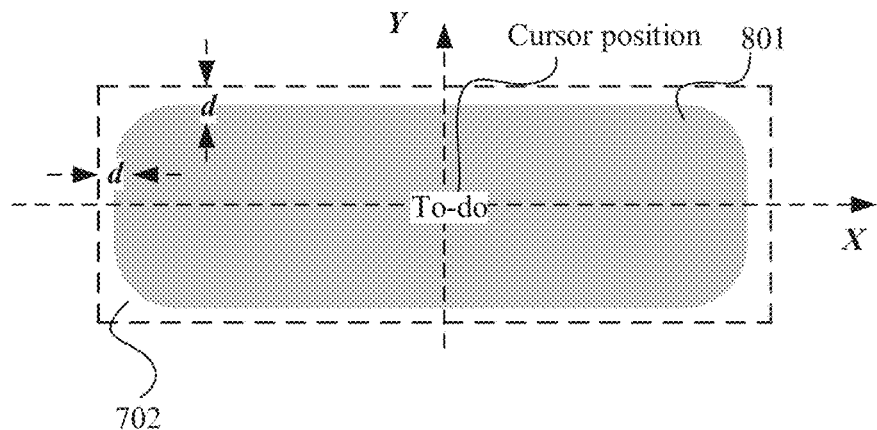

For example, as described above, the position of the cursor 801 may be changed along with the cursor center (that is, the actual position of the cursor) to implement a pulling effect, so that the user may determine the actual position of the cursor based on a position movement of the cursor 801. FIG. 13*a* to FIG. 13*c* exemplarily show a schematic diagram of a pulling effect. Referring to (1) in FIG. 13*a*, for example, the view system may establish a coordinate system in the hot zone 702. In the embodiments of this application, a coordinate system is established with a geometric center of the hot zone 702 as a center. An X axis is parallel to a length of the hot zone 702, and a Y axis is parallel to a height of the hot zone 702. It should be noted that a coordinate system in the embodiments of this application is only an illustrative example, and is not limited in this application.

Continuing to refer to (1) in FIG. 13*a*, for example, when the view system detects that the actual position of the cursor is located in a first quadrant of the coordinate system. A position of the cursor 801 is close to an upper frame and a right frame of the hot zone 702. That is, there is a gap between a left frame of the hot zone 702 and the cursor 801, and there is a gap between a lower frame of the hot zone 702 and the cursor 801. It should be noted that as described above, a shape and a size of the cursor 801 may be set according to actual needs. Correspondingly, in a pulling process of the cursor 801, a pulling effect of the cursor 801 may also be different depending on the shape and the size of the cursor 801. For example, when the shape of the cursor 801 is a circle, and when the cursor 801 is pulled to an upper right corner of the hot zone 702, the cursor 801 is tangent to the upper frame and the right frame of the hot zone 702.

Referring to (2) in FIG. 13*a*, for example, when the view system detects that the actual position of the cursor is in a positive direction of the X axis of the coordinate system, then the cursor 801 is close to the right frame of the hot zone 702. In addition, there is a gap between the cursor 801 and the upper frame, the lower frame, and the left frame of the hot zone 702.

Referring to (3) in FIG. 13*a*, for example, when the view system detects that the actual position of the cursor is located in a fourth quadrant of the coordinate system, the position of the cursor 801 is close to the lower frame and the right frame of the hot zone 702. That is, there is a gap between the left frame and the upper frame of the hot zone 702 and the cursor 801.

Referring to (4) in FIG. 13*a*, for example, when the view system detects that the actual position of the cursor is in a negative direction of the Y axis of the coordinate system, then the position of the cursor 801 is close to the lower frame of the hot zone 702. That is, there is a gap between the left frame, the upper frame, and the right frame of the hot zone 702 and the cursor 801.

Referring to (5) in FIG. 13*a*, for example, when the view system detects that the actual position of the cursor is located in a third quadrant of the coordinate system, the position of the cursor 801 is close to the lower frame and the left frame of the hot zone 702. That is, there is a gap between the right frame and the upper frame of the hot zone 702 and the cursor 801.

Referring to (6) in FIG. 13*a*, for example, when the view system detects that the actual position of the cursor is in a negative direction of the X axis of the coordinate system, then the cursor 801 is close to the left frame of the hot zone 702. In addition, there is a gap between the cursor 801 and the upper frame, the lower frame, and the right frame of the hot zone 702.

Referring to (5) in FIG. 13*a*, for example, when the view system detects that the actual position of the cursor is located in a second quadrant of the coordinate system, the position of the cursor 801 is close to the upper frame and the left frame of the hot zone 702. That is, there is a gap between the right frame and the lower frame of the hot zone 702 and the cursor 801.

Referring to (8) in FIG. 13*a*, for example, when the view system detects that the actual position of the cursor is in a positive direction of the Y axis of the coordinate system, then the position of the cursor 801 is close to the upper frame of the hot zone 702. That is, there is a gap between the left frame, the lower frame, and the right frame of the hot zone 702 and the cursor 801.

Referring to (9) in FIG. 13*a*, for example, when the view system detects that the actual position of the cursor is at a distal point of the coordinate system, the position of the cursor 801 is at the center of the hot zone 702. That is, there are gaps between four frames of the hot zone 702 and the cursor 801.

It should be noted that FIG. 13*a* only exemplarily shows a correspondence between the cursor 801 and the actual position of the cursor. In practical applications, the cursor 801 may change as the actual position of the cursor changes. That is, the user may control the actual position of the cursor to change by moving the mouse, so as to pull the cursor 801 from a current position to a corresponding position.

For example, the user may move the actual position of the cursor to the position shown in (1) in FIG. 13*a* by moving the mouse. In response to a received user operation, the tablet detects that the actual position of the cursor moves to the position shown in (1) in FIG. 13*a*. That is, the actual position of the cursor is in a first quadrant of the coordinate system. Correspondingly, the view system pulls the cursor 801 to the position shown in (1) in FIG. 13*a*, that is, pulls the cursor 801 to the upper right corner of the hot zone 702. Next, the user may continue to move the mouse to move the actual position of the cursor to the position shown in (2) in FIG. 13*a*. In response to the received user operation, the tablet detects that the actual position of the cursor moves to the position shown in (2) in FIG. 13*a*. That is, the actual position of the cursor moves to the positive direction of the X axis. Correspondingly, the view system pulls the cursor 801 downward from the upper right corner of the hot zone 702, so that the position of the cursor 801 moves to the position shown in (2) in FIG. 13*a*. For example, the user may continue to move the mouse to move the actual position of the cursor to the position shown in (5) in FIG. 13*a*. In response to the received user operation, the tablet detects that the actual position of the cursor moves to the position shown in (5) in FIG. 13*a*. That is, the actual position of the cursor is in the third quadrant of the coordinate system. Correspondingly, the view system pulls the cursor 801 from the position shown in (2) in FIG. 13*a*, that is, pulls the cursor 801 to the lower left of the hot zone 702, so that the position of the cursor 801 moves to the position shown in (5) in FIG. 13*a*.

It should be noted that in the embodiments of this application, a movement speed of the cursor 801 in a process of being pulled may optionally be the same as a movement speed of the actual position of the cursor.

For example, the pulling process shown in FIG. 13*a* is determined based on the actual position of the cursor at a position of a quadrant in the coordinate system. In the embodiments of this application, the view system may further refine displacement of the actual position of the cursor and displacement of the cursor 801, so as to implement accurate pulling of the cursor 801 by the actual position of the cursor.

Referring to (1) in FIG. 13*b*, for example, the view system establishes a coordinate system in the hot zone 702. For an establishment process, reference may be made to the above, and details are not repeated herein. For example, an intersection between the left frame of the hot zone 702 and the X axis is denoted as x11, an intersection between the right frame of the hot zone 702 and the X axis is denoted as x21, an intersection between the upper frame of the hot zone 702 and the Y axis is denoted as y11, and an intersection between the lower frame of the hot zone 702 and the Y axis is denoted as y21.

Continuing to refer to (1) in FIG. 13*b*, for example, when detecting that the actual position of the cursor is at an origin of the coordinate system, the view system places the cursor 801 at the center of the hot zone 702. For example, an intersection between the left frame of the cursor 801 and the X axis is denoted as x12, an intersection between the left frame of the cursor 801 and the X axis is denoted as x22, an intersection between the upper frame of the cursor 801 and the Y axis is denoted as y12, and an intersection between the lower frame of the cursor 801 and the Y axis is denoted as y22. For example, |x22|=|x12|, and |y22|=|y12|.

In a possible implementation, a maximum offset of the cursor center, that is, the actual position of the cursor on the x axis is x21/2, and a maximum offset on the y axis is y11/2. It should be noted that the maximum offset refers to a maximum distance obtained by starting to move from the origin. For example, relative to a coordinate origin, the maximum offset of the cursor 801 on the x axis is (x21−x22)/2, and the maximum offset on the y axis is (y11−y12)/2. For example, in the embodiments of this application, an offset of the actual position of the cursor has a linear correspondence with an offset of the cursor. In other embodiments, the offset of the actual position of the cursor has a correspondence of another curve with the offset of the cursor. This is not limited in this application.

For example, referring to (2) in FIG. 13*b*, the user controls the actual position of the cursor to move to the position shown in (1) in FIG. 13*b* through the mouse. The view system detects that the actual position of the cursor moves, and obtains the offset of the actual position of the cursor on the x axis and the y axis. The view system may pull the cursor 801 to the positive direction of the X axis and the positive direction of the Y axis based on a linear relationship between the offset of the actual position of the cursor and the offset of the cursor. For example, after the cursor 801 is pulled, coordinates of the left frame, the right frame, the upper frame, and the lower frame of the cursor 801 in the coordinate system are: x13, x14, y13, and y14 respectively.

In a possible implementation, a maximum offset of the cursor 801 may correspond to a maximum offset in an X-axis direction. That is, the maximum offset of the cursor 801 is (x21−x22)/2. For example, as shown in (3) in FIG. 13*b*, when the maximum offset of the cursor 801 corresponds to that in the X-axis direction, if the offset of the actual position of the cursor reaches a maximum value of the X-axis direction and a maximum value of the Y-axis direction, the maximum offset of the cursor 801 may reach a maximum value of a maximum offset in the X-axis direction. For example, when the actual position of the cursor is at the upper right corner of the hot zone 702, the cursor 801 is pulled from a center position (that is, the position shown in (1) in FIG. 13*b*) to the position shown in (3) in FIG. 13*b*. Coordinates of the left frame, the right frame, the upper frame, and the lower frame of the cursor 801 in the coordinate system are: x15, x16, y15, and y16 respectively. x16=x21, and y15=y11.

In another possible implementation, a maximum offset of the cursor 801 may correspond to a maximum offset in a Y-axis direction. That is, the maximum offset of the cursor 801 is (y11−y12)/2. For example, as shown in (4) in FIG. 13*b*, when the maximum offset of the cursor 801 corresponds to that in the Y-axis direction, if the offset of the actual position of the cursor reaches a maximum value of the X-axis direction and a maximum value of the Y-axis direction, the maximum offset of the cursor 801 may reach a maximum value of a maximum offset in the Y-axis direction. For example, when the actual position of the cursor is at the upper right corner of the hot zone 702, the cursor 801 is pulled from a center position (that is, the position shown in (1) in FIG. 13*b*) to the position shown in (4) in FIG. 13*b*. Coordinates of the left frame, the right frame, the upper frame, and the lower frame of the cursor 801 in the coordinate system are: x17, x18, y17, and y18 respectively. y17=y11. That is, the maximum offset of the cursor 801 in the X-axis direction may only reach (y11−y12)/2. Even if the actual position of the cursor reaches the maximum offset of the X axis, there is still a gap between the left frame (or right frame) of the cursor 801 and the left frame (or right frame) of the hot zone 702.

In yet another possible implementation, as described above, the shape of the cursor 801 may be similar to the shape of the hot zone 702, but a ratio of a length to a height of the cursor 801 may be different from a ratio of a length to a height of the hot zone 702. As shown in FIG. 13*c*, for example, the shape of the cursor 801 is still a rectangle. Four corners of the cursor 801 are prototypes, and the ratio of the length to the height of the cursor 801 is different from that of the hot zone 702. For example, when the actual position of the cursor is at the center of the coordinate, and the cursor 801 is at the center of the hot zone 702, a distance between the upper frame of the cursor 801 and the upper frame of the hot zone 702, a distance between the left frame of the cursor 801 and the left frame of the hot zone 702, a distance between the lower frame of the cursor 801 and the lower frame of the hot zone 702, and a distance between the right frame of the cursor 801 and the right frame of the hot zone

702 may be the same, for example, all are d. The view system may implement any pulling manner described in FIG. 13*a* and FIG. 13*b* based on the correspondence between the cursor and the hot zone 702 shown in FIG. 13*c*, which is not limited in this application.

Figure 14A:
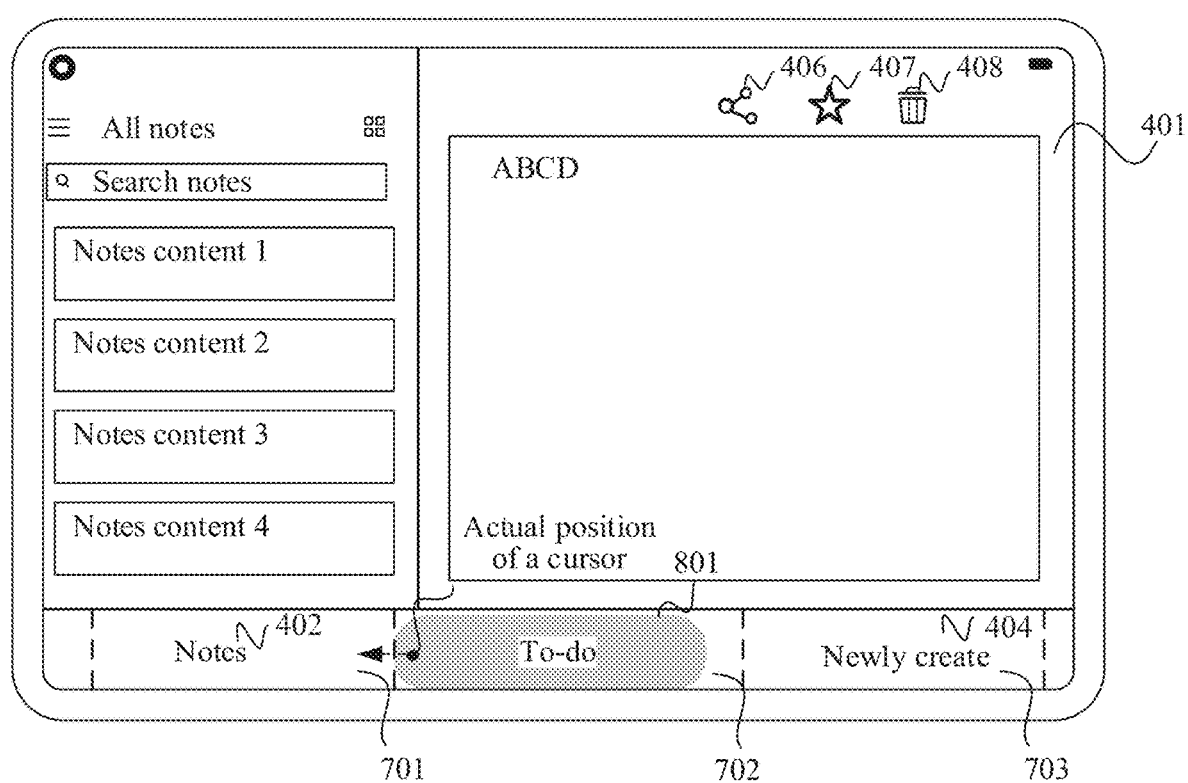
FIG. 14a to FIG. 14c exemplarily show a schematic diagram of a movement of a cursor.
Figure 14B:
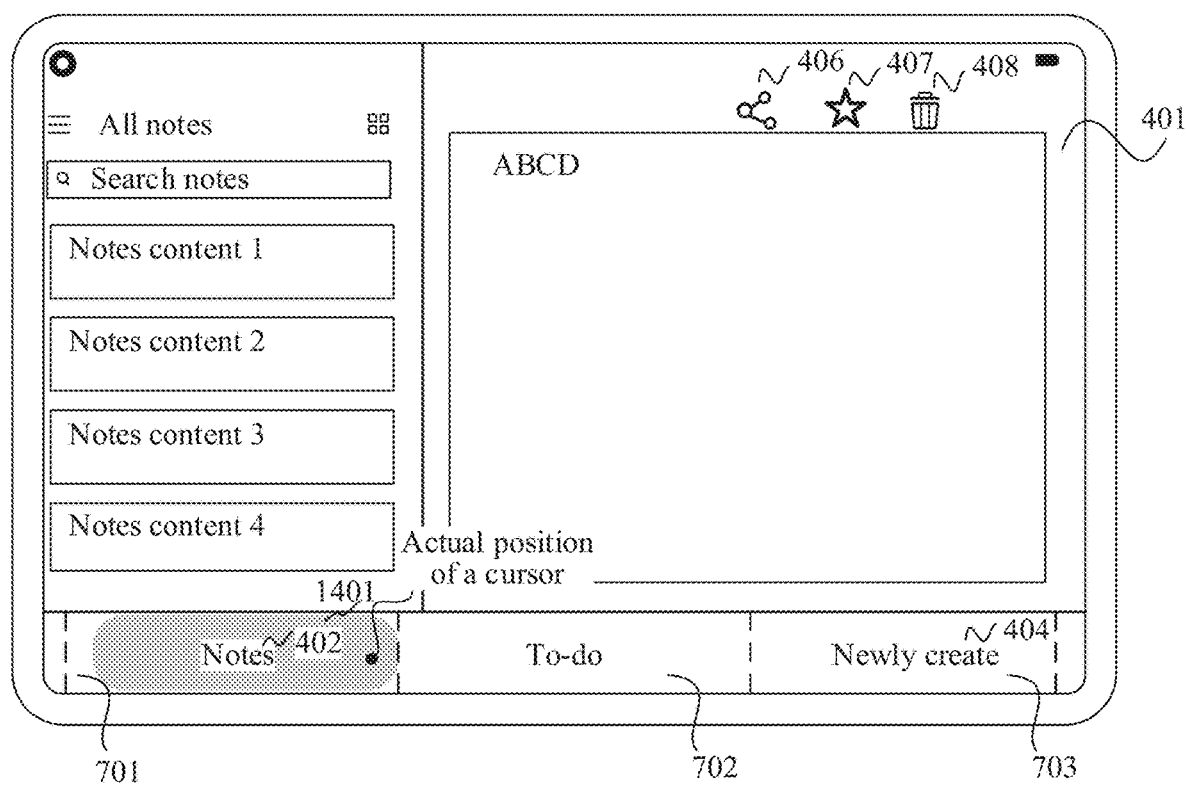

FIG. 14*a* to FIG. 14*b* exemplarily show a schematic diagram of a movement of a cursor. Referring to FIG. 14*a*, for example, the user controls the cursor to move from the to-do control 403 to the note control 402 through the mouse. For example, the view system detects that the actual position of the cursor moves from the to-do control 403 to a direction of the note control 402. The view system may pull the cursor 801 from the current position (such as the position shown in FIG. 12) to the position shown in FIG. 14*a*. For a specific pulling manner, reference may be made to related descriptions in FIG. 13*a* to FIG. 13*c*, which is not repeated herein.

For example, referring to FIG. 14*b*, the view system detects that the actual position of the cursor moves into the hot zone 701 corresponding to the note control 402. The view system draws a cursor 1401 in the hot zone 702. For example, a shape and a size of the cursor 1401 is the same as a shape and a size of the cursor 801. It may be understood that the view system translates the cursor 801 into the hot zone 701.

In another possible implementation, when the cursor moves between two different hot zones, for a display manner of the cursor, reference may be made to a display manner shown in FIG. 10. For example, referring to (1) in FIG. 14*c*, for example, the actual position of the cursor moves to the left frame of the hot zone 702 along with the mouse.

Correspondingly, the cursor 801 is pulled to a left side of the hot zone 702. Then, the cursor 801 disappears. Referring to (2) in FIG. 14*c*, for example, after the cursor 801 disappears, the view system may draw a cursor 1402 at a corresponding position of the hot zone 701 based on a movement direction (that is, moving toward a direction of the note control) of the cursor. For specific details, reference may be made to related descriptions shown in FIG. 10, which is not be repeated herein.

Figure 14C:
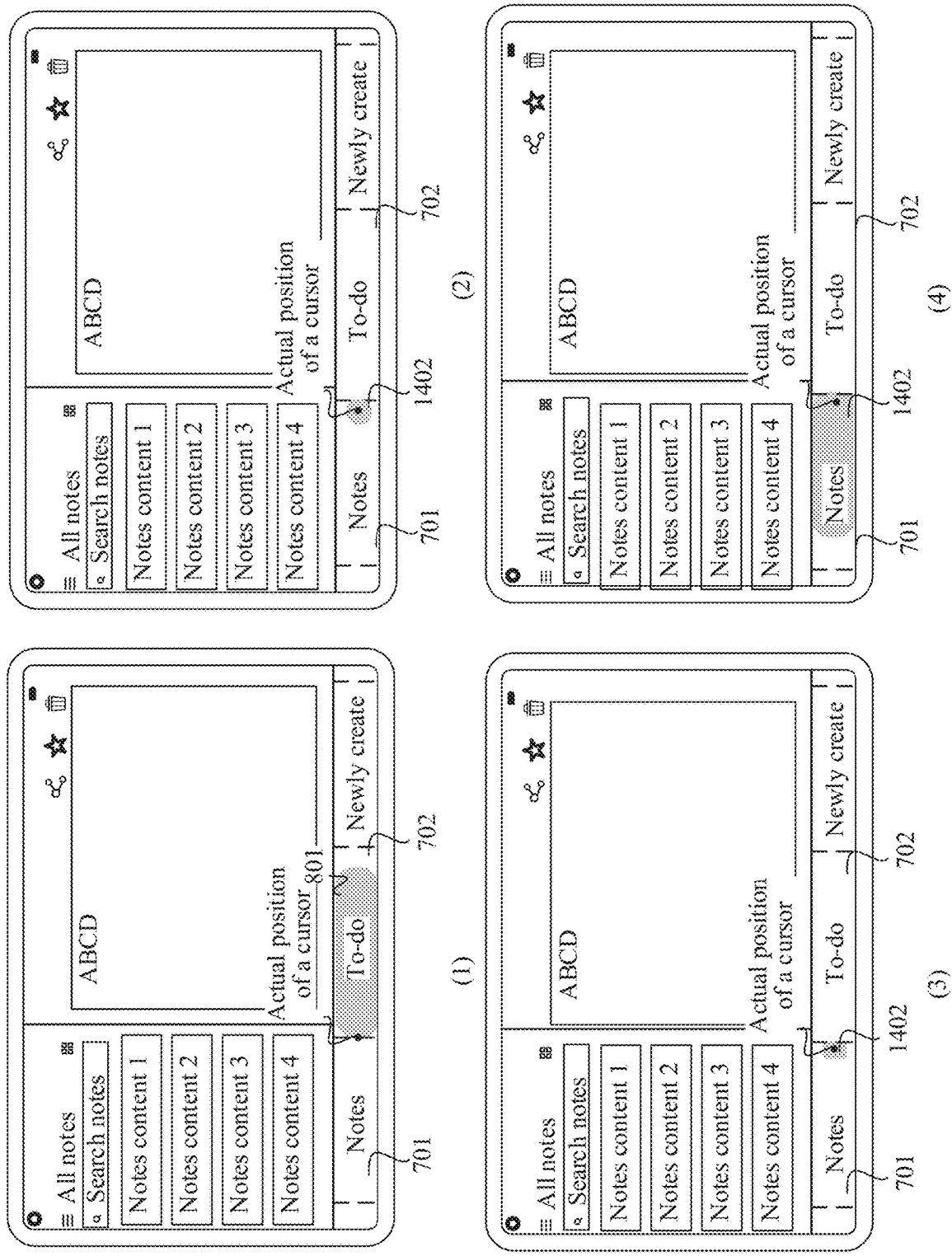

Referring to (3) in FIG. 14*c*, for example, the view system deforms the cursor 1402 in the hot zone 701, that is, gradually enlarges the cursor 1402, and deforms the cursor 1402 to the shape and the position shown in (4) in FIG. 14*c*. For specific details, reference may be made to related descriptions shown in FIG. 10, which is not be repeated herein.

Figure 15A:
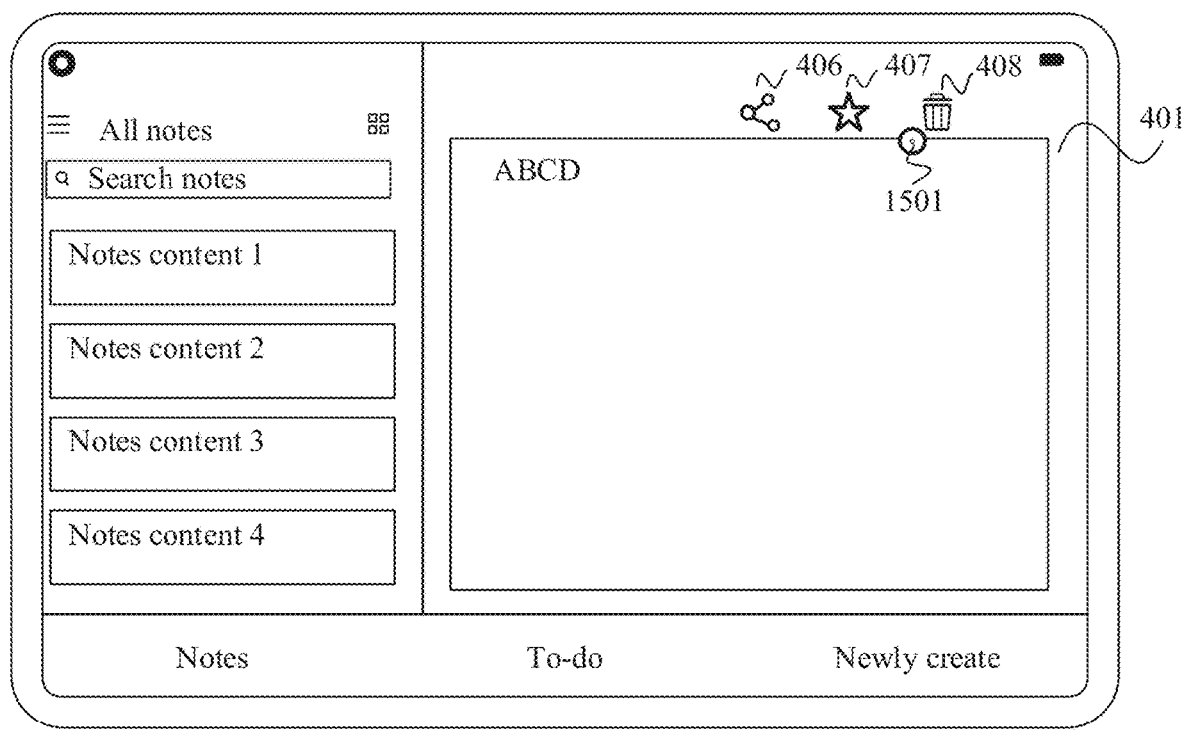
FIG. 15a to FIG. 15e exemplarily show a schematic diagram of a cursor display manner.

For example, a cursor display manner in the embodiments of this application may be applied to any control on the display interface. FIG. 15*a* to FIG. 15*e* exemplarily show a schematic diagram of a cursor display manner. Referring to FIG. 15*a*, for example, a cursor 1501 moves to the favorite control 407 on the display interface 401 following the mouse. For example, when the cursor system detects that a cursor center of the cursor 1501 moves to the edge of the hot zone of the favorite control 407, the cursor 1501 disappears. In addition, the view system draws the cursor in the hot zone 701 of the favorite control 407 based on a movement direction of the cursor 1501.

Figure 15B:
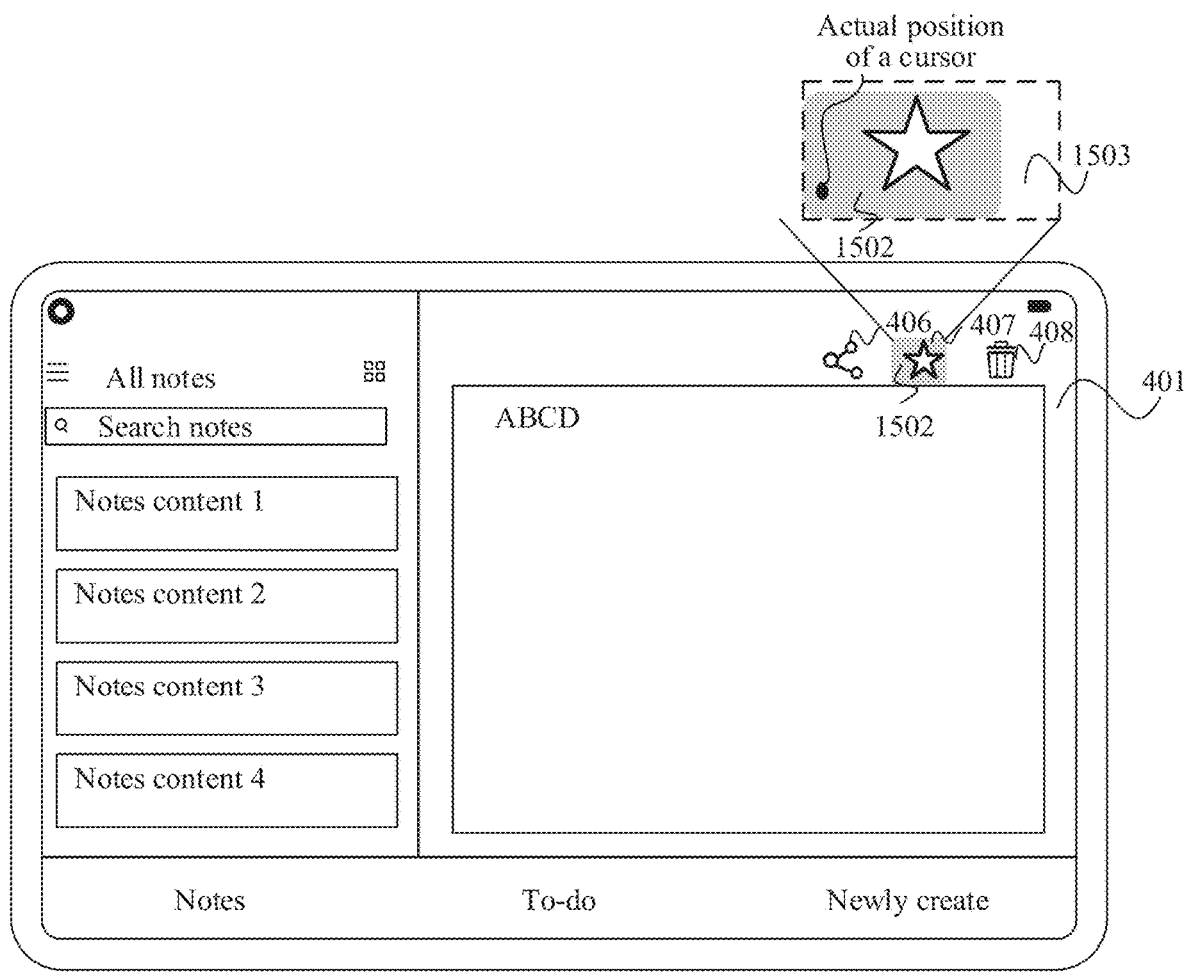

Referring to FIG. 15*b*, the view system draws and displays a cursor 1502 in the favorite control 407. The view system gradually enlarges and deforms the cursor 1502 to approximate a shape of a hot zone 1503. In addition, because the actual position of the cursor is at the lower left of the hot zone 1503, the position of the cursor 1502 is also at the lower left of the hot zone 1503. For details that are not described, reference may be made to the above, which is not repeated herein.

Figure 15C:
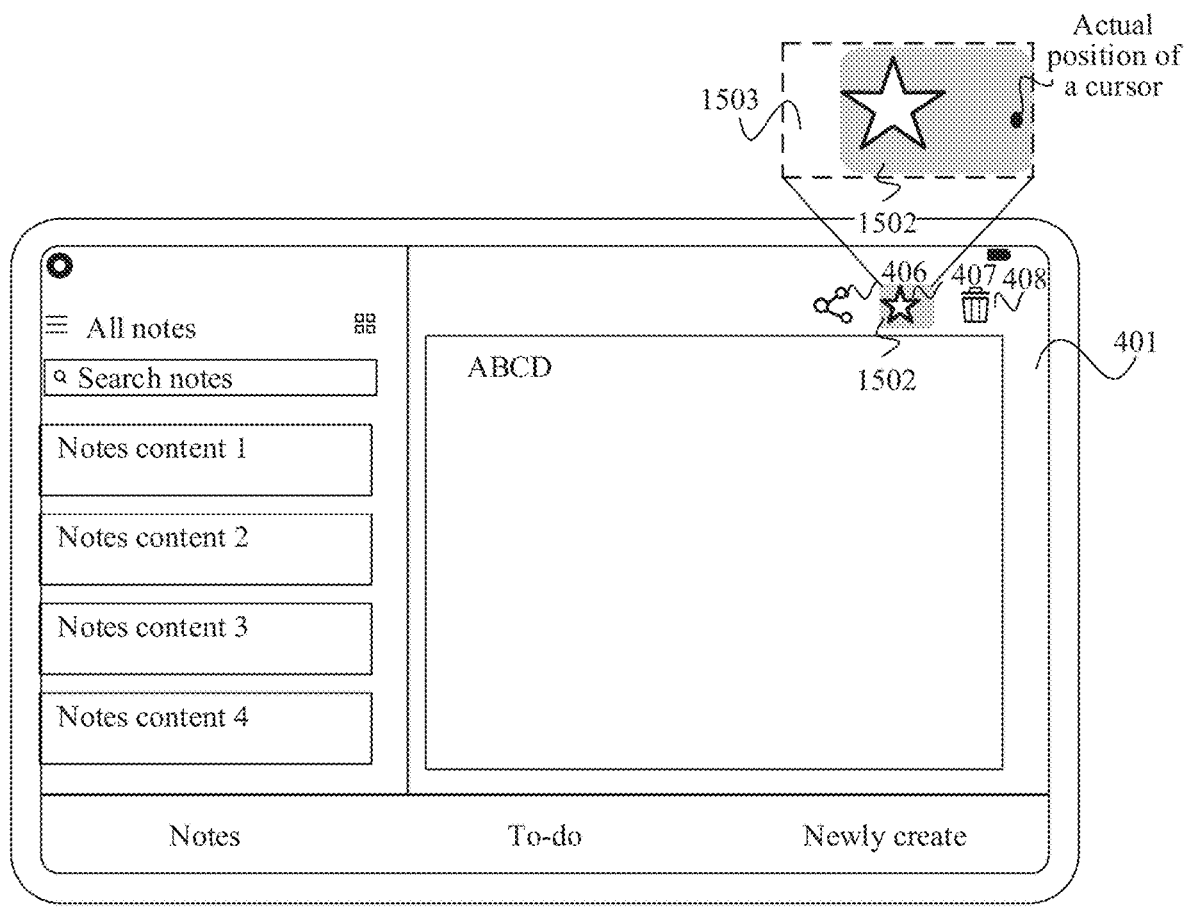

Referring to FIG. 15*c*, for example, the actual position of the cursor moves with the mouse toward a direction of the delete control. The cursor 1502 is pulled to a right side of the hot zone 1503 along with the actual position of the cursor. For a specific pulling manner, reference may be made to the above, which is not repeated herein again.

Figure 15D:
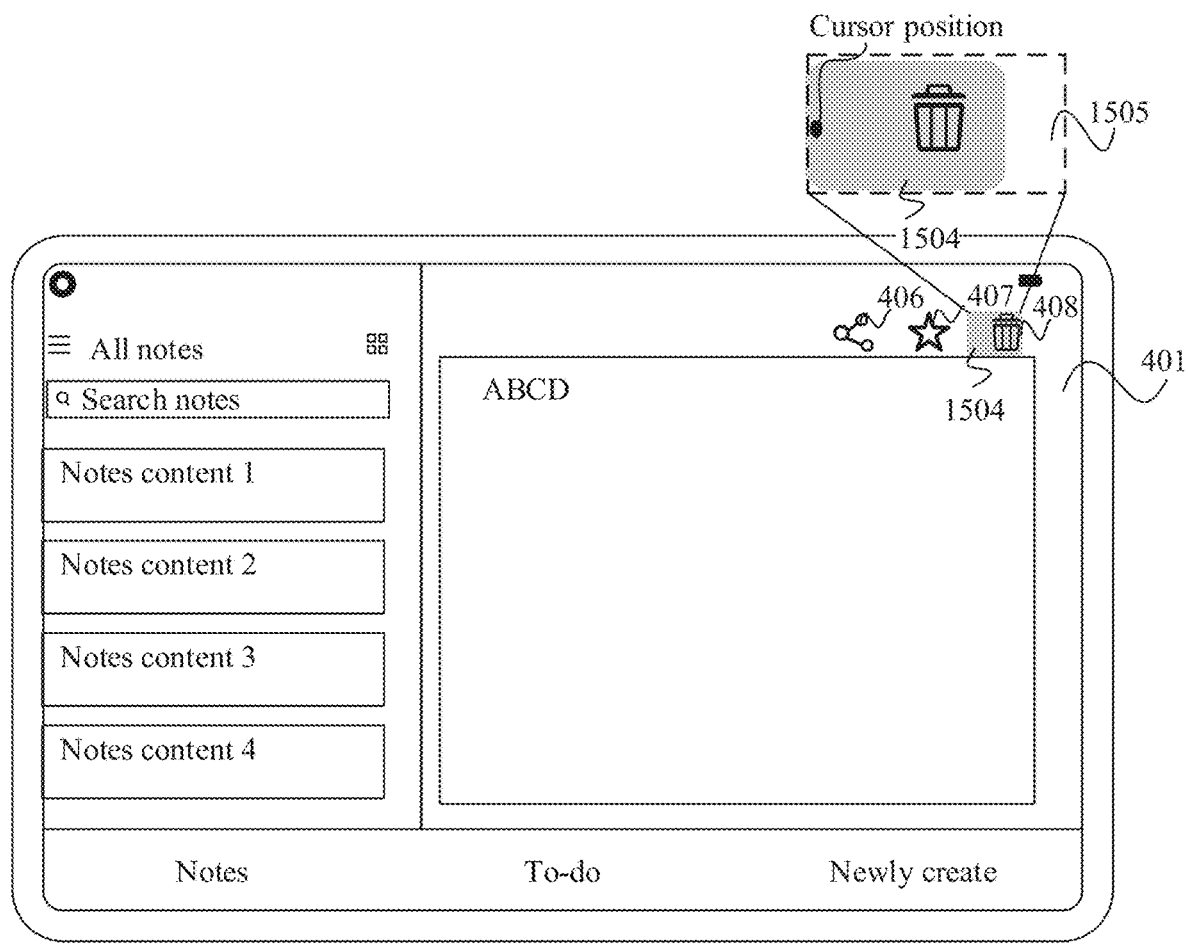

Referring to FIG. 15*d*, for example, the actual position of the cursor moves into a hot zone 1505 of the delete control 408 along with the mouse. The view system draws and displays a cursor 1504 in the hot zone 1505. For a specific process, reference may be made to the process shown in FIG. 14*b* or FIG. 14*c*, which is not repeated herein. That is, if the cursor is displayed according to the process shown in FIG. 14*b*, from the perspective of the user, the cursor is translated from the favorite control 407 to the delete control 408 along with the actual position of the cursor. If the cursor is displayed according to the process shown in FIG. 14*c*, from the perspective of the user, the cursor jumps from the favorite control 407 to the delete control 408 along with the actual position of the cursor, and is gradually deformed to the shape shown in FIG. 15*d*.

Figure 15E:
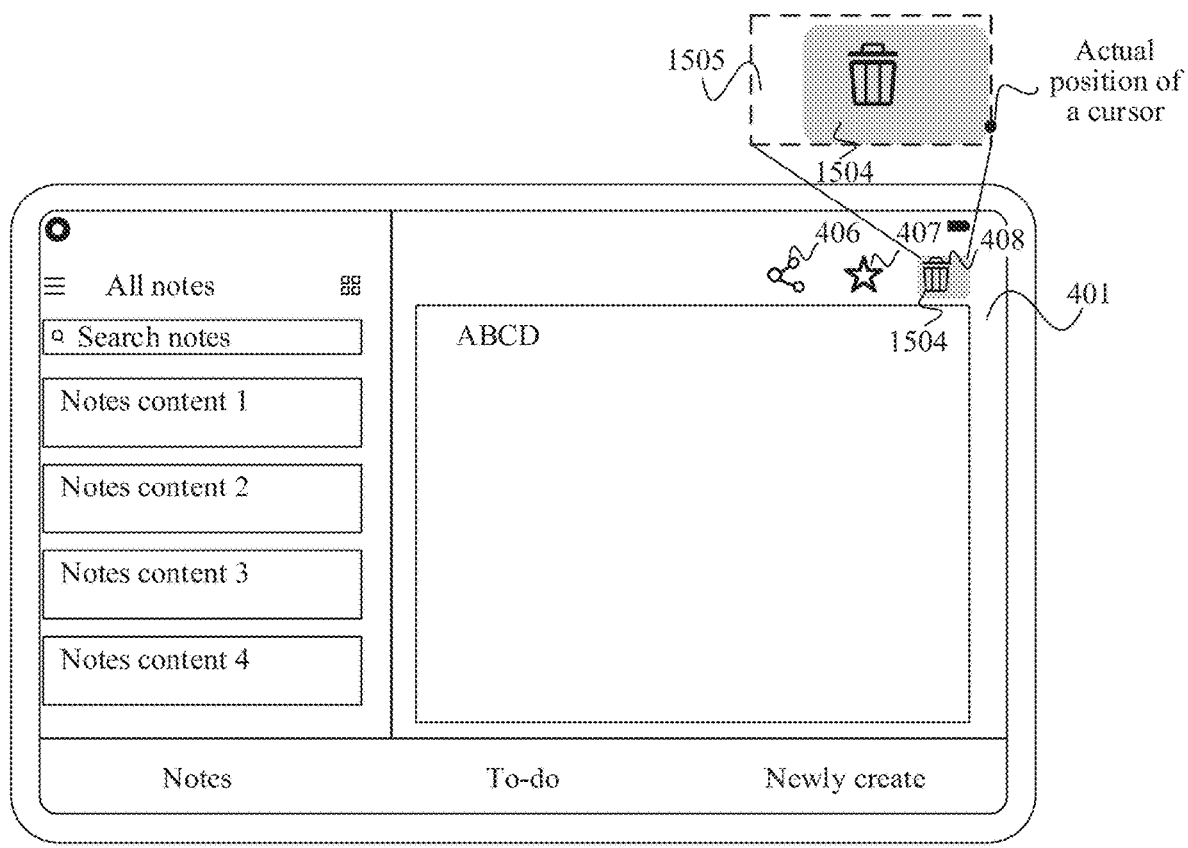

Referring to FIG. 15*e*, for example, the actual position of the cursor moves to the edge of the hot zone 1505 of the delete control 408 along with the mouse. Correspondingly, the cursor 1504 moves to the lower right of the hot zone 1505 along with the actual position of the cursor.

Figure 16:
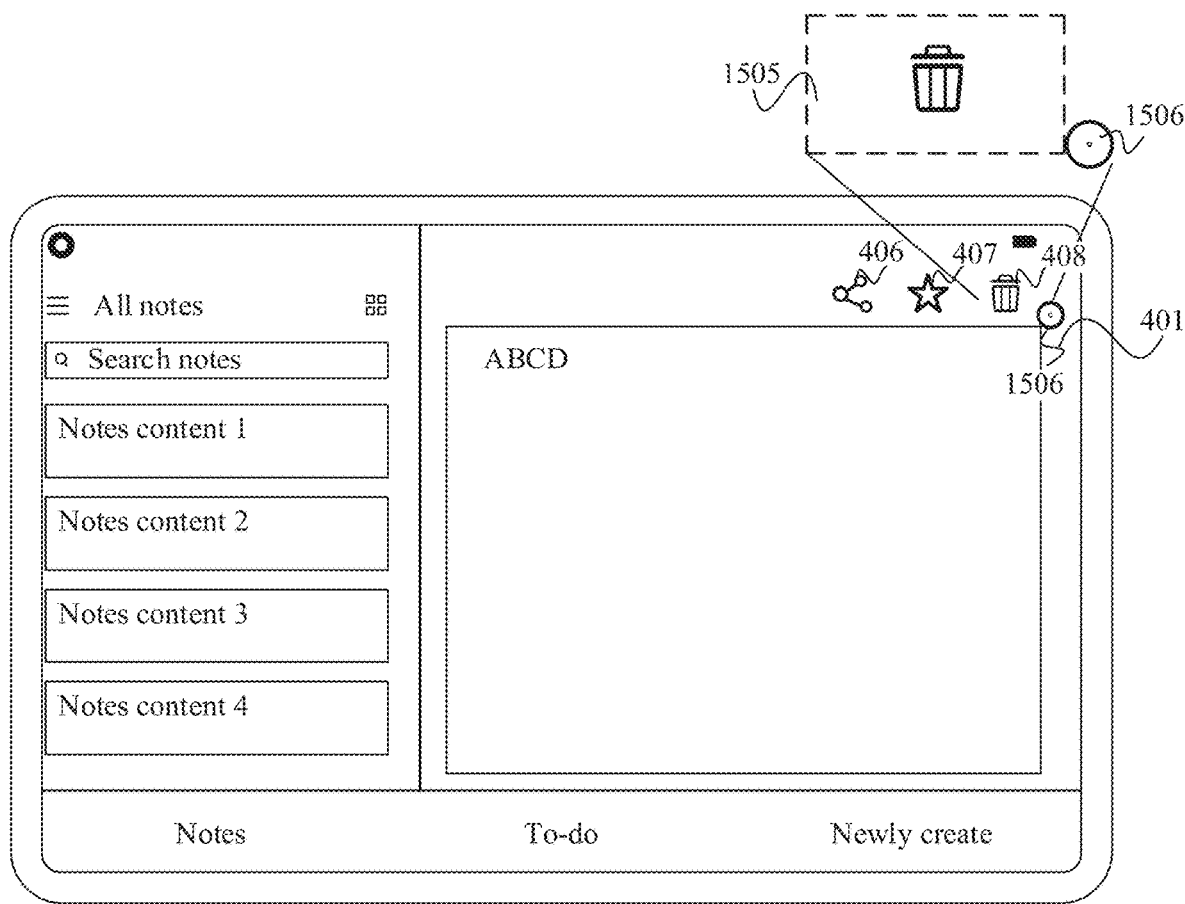
FIG. 16 exemplarily shows a schematic diagram displaying a cursor.

Referring to FIG. 16, for example, the actual position of the cursor moves out of the hot zone 1505 along with the mouse. Correspondingly, the cursor 1504 disappears, and the view system redraws the cursor 1506 on the display interface 401. For example, for a drawing manner of the cursor 1506, reference may be made to FIG. 5*a*, which is not repeated herein. Optionally, a position of the cursor 1506 may be determined based on the actual position of the cursor in a movement direction of the hot zone 1505, for example, in a movement direction of the actual position of the cursor and close to the position of the hot zone 1505. In other embodiments, the cursor 1506 may also take any direction close to a position of the hot zone 1505. A principle is similar to that shown in FIG. 9*a* and FIG. 9*b*, which is not repeated herein.

Figure 17A:
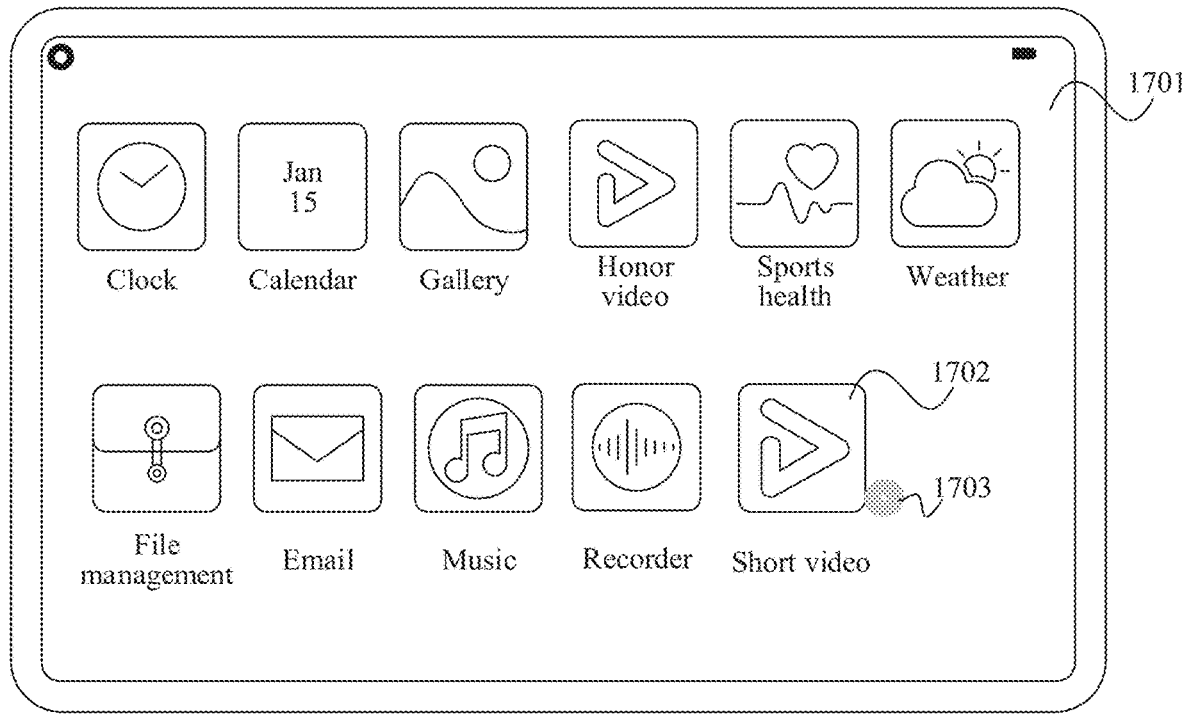
FIG. 17a to FIG. 17i exemplarily show a schematic diagram displaying a cursor.

For example, the cursor display manner in the embodiments of this application may further be applied to a desktop icon. Referring to FIG. 17*a*, for example, a display interface 1701 includes one or more icon controls, such as a short video icon control 1702. For example, a cursor 1703 may move to the short video icon control 1702 along with the mouse.

Figure 17B:
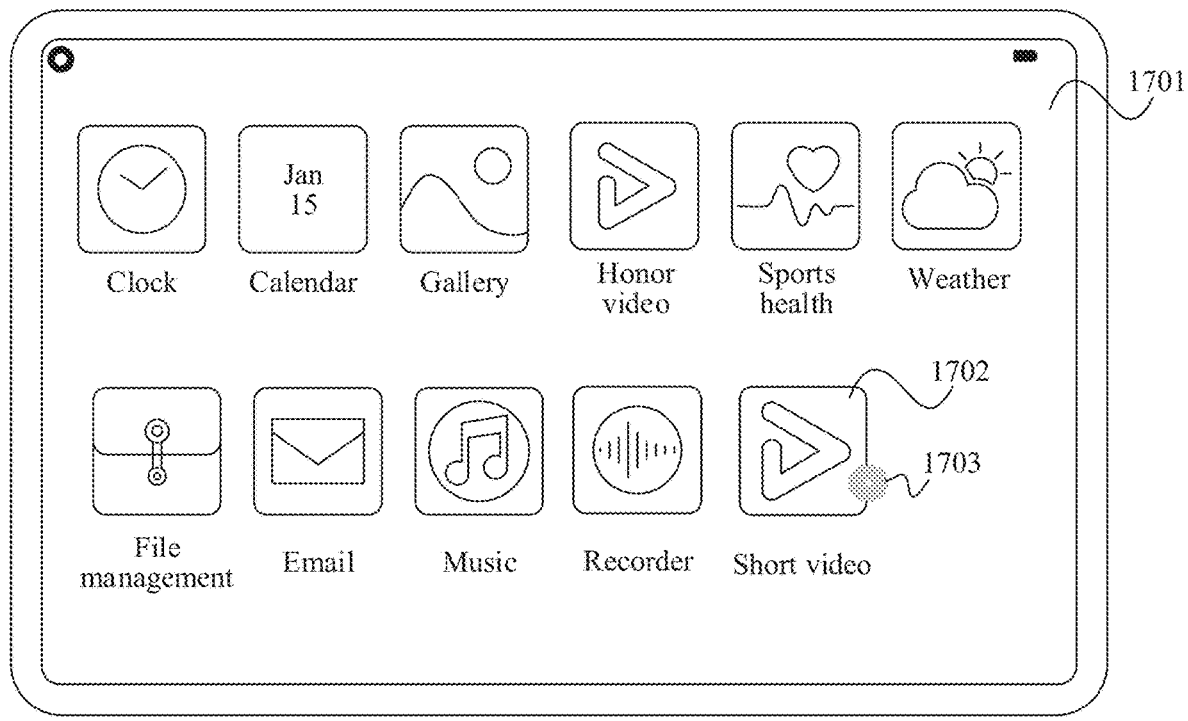

Referring to FIG. 17*b*, for example, a cursor 1702 moves to an edge of the short video icon control 1702 along with the mouse. That is, the cursor center of the cursor 1702 is located at a right edge of the short video icon control 1702. For example, After the cursor 1702 disappears, the view system draws the cursor in the short video icon control 1702.

Figure 17C:
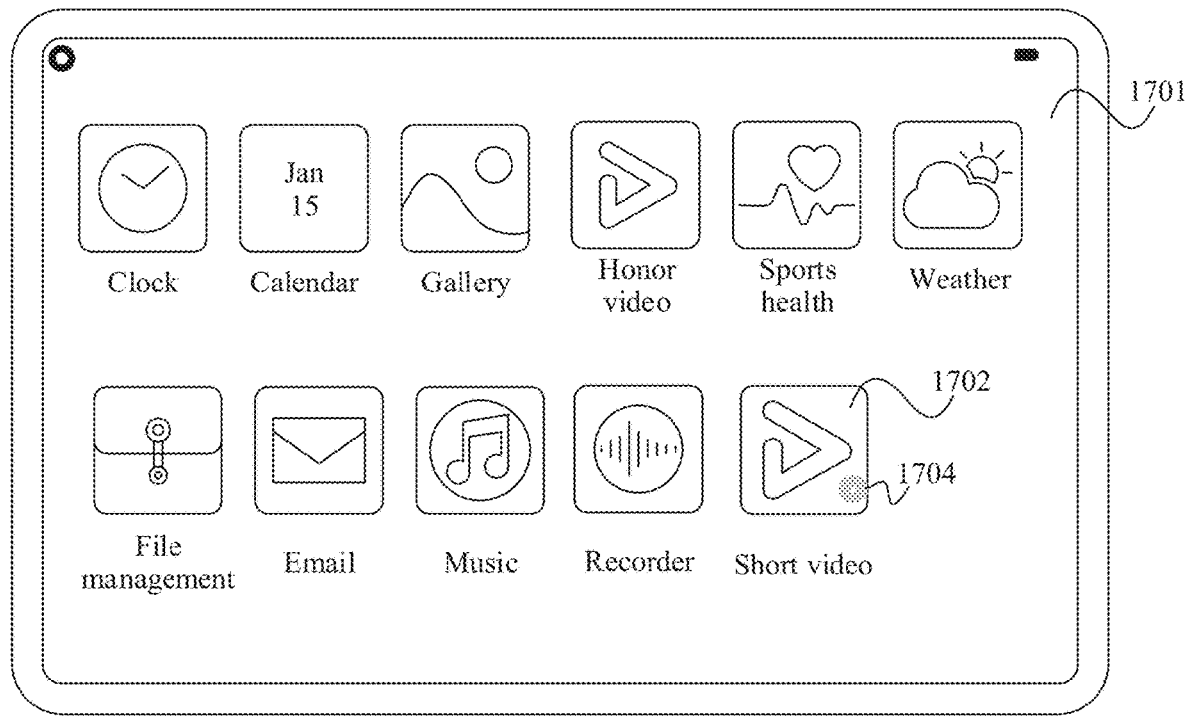

Referring to FIG. 17*c*, for example, after the cursor disappears, the view system draws a cursor 1704 in the short video icon control 1702. For example, for a drawing manner and a position of the cursor 1704, reference may be made to the above, which is not repeated herein.

Figure 17D:
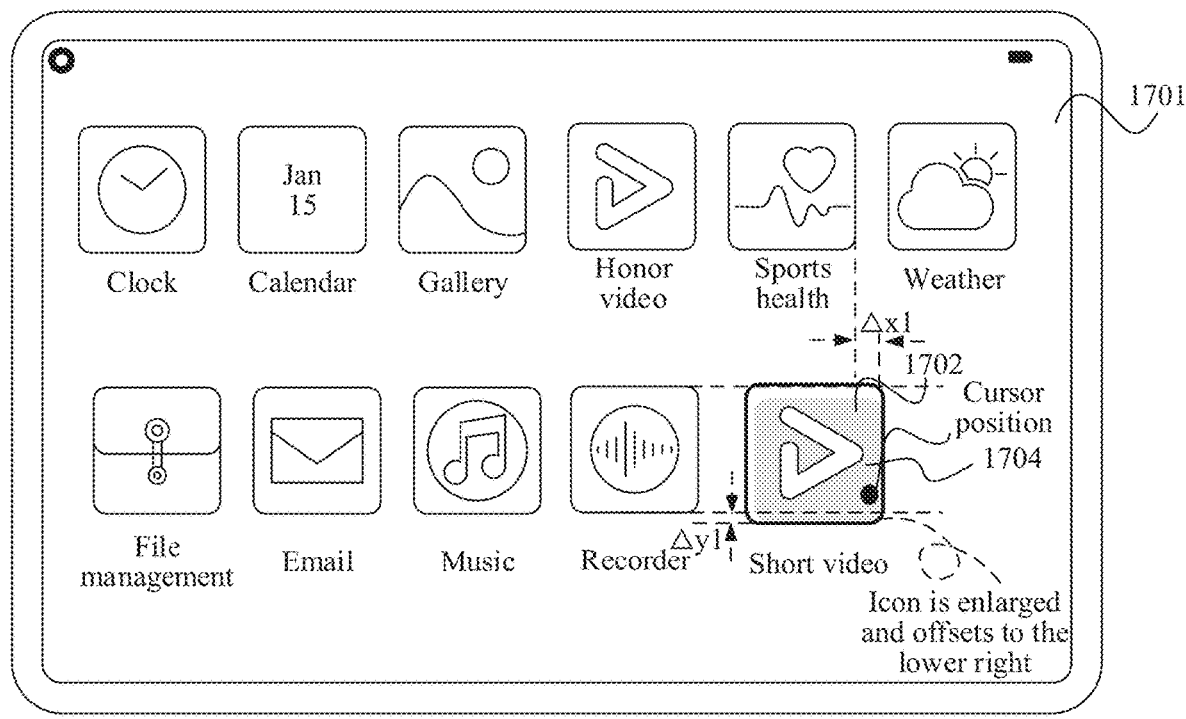

Referring to FIG. 17*d*, for example, the cursor 1704 is gradually enlarged and deformed to the cursor 1704 whose shape and size are the same as a shape and a size of the short video icon control 1702. In a process in which the cursor 1704 is gradually enlarged and deformed, transparency of the cursor 1704 gradually becomes higher until the cursor 1704 is completely transparent.

Continuing to refer to FIG. 17d, for example, a position of the cursor 1704 optionally corresponds to the actual position of the cursor. For example, the actual position of the cursor is located at the lower right of the short video icon control 1702, and correspondingly, the cursor 1704 is also gradually enlarged and deformed from the lower right. For example, in the embodiments of this application, for the icon control, the icon control is also gradually enlarged in a deformation process of the cursor 1704, and is pulled to a corresponding position along with the actual position of the cursor.

For example, still referring to FIG. 17d, for example, the actual position of the cursor is located at the lower right of the short video icon control 1702. In a process in which the cursor 1704 is gradually enlarged and deformed, the short video icon control 1702 is gradually enlarged and offsets to the lower right. Optionally, a maximum value of an offset for the icon control may be set in the view system. In addition, the offset of the icon control corresponds to the offset of the actual position of the cursor. It may be understood that a pulling manner of the icon control is similar to a pulling manner of the cursor described above. For example, the short video icon control 1702 is enlarged, and gradually offsets to the lower right. For example, when the cursor 1702 is enlarged and deformed to the shape shown in FIG. 17d, the short video icon control 1702 offsets rightward by $\Delta x1$ and offsets downward by $\Delta y1$.

Figure 17E:
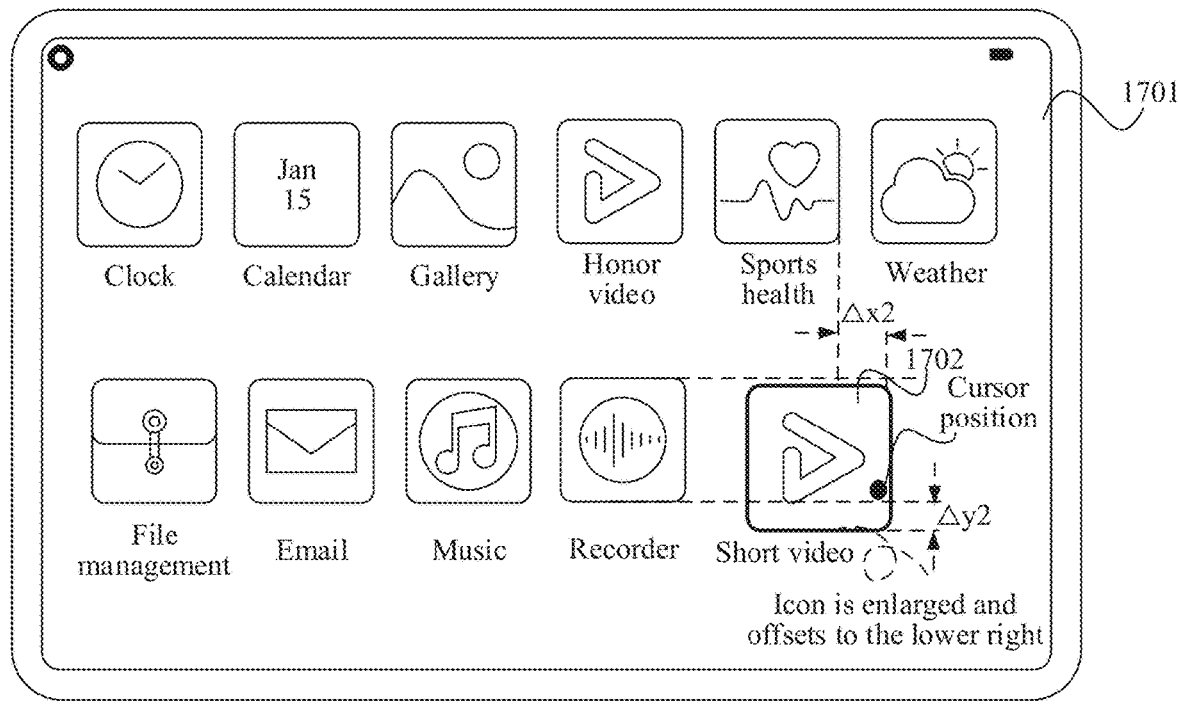

For example, as described above, transparency of the cursor 1704 is gradually increased in a deformation process. As shown in FIG. 17e, for example, the transparency of the cursor 1704 is a maximum value, that is, completely transparent. In addition, because the actual position of the cursor is at a rightmost side of the short video icon control 1702, correspondingly, the short video icon control 1702 is gradually enlarged and offsets rightward to the maximum value (which may be set according to actual needs, and is not limited in this application). It should be noted that a maximum size of the short video icon control 1702 that is enlarged may be the same as a size of the short video icon control 1702, or less than the size of the short video icon control 1702. Details may be set according to actual needs, which is not limited in this application.

Still referring to FIG. 17e, for example, based on a position of the actual position of the cursor in the short video icon control 1702, an offset of the short video icon control that is horizontally rightward is a maximum value of an offset that may be achieved in a horizontal direction, that is $\Delta x2$. An offset of the short video icon control that is vertically downward in a vertical direction is $\Delta y2$. Optionally, based on an offset between the actual position of the cursor and an origin of the short video icon control 1702 (that is, an offset in a vertical direction is less than an offset in a horizontal offset), correspondingly, the offset $\Delta y2$ of the short video icon control in the vertical direction is less than the offset $\Delta x2$ in the horizontal direction. For parts that are not described, reference may be made to content related to pulling of the cursor and the actual position of the cursor above, which is not repeated herein.

For example, in the embodiments of this application, the actual position of the cursor may move along with the mouse in the short video icon control. Correspondingly, the short video icon control 1702 maintains a current size (that is, an enlarged size) and moves along with the actual position of the cursor, so as to implement a pulling effect on the short video icon control 1702. It should be noted that because the cursor is currently completely transparent, in fact, the current shape and size of the cursor are exactly the same as that of the short video icon control. Correspondingly, the cursor is also pulled together with the short video icon control, which is the same below and is not repeated.

Figure 17F:
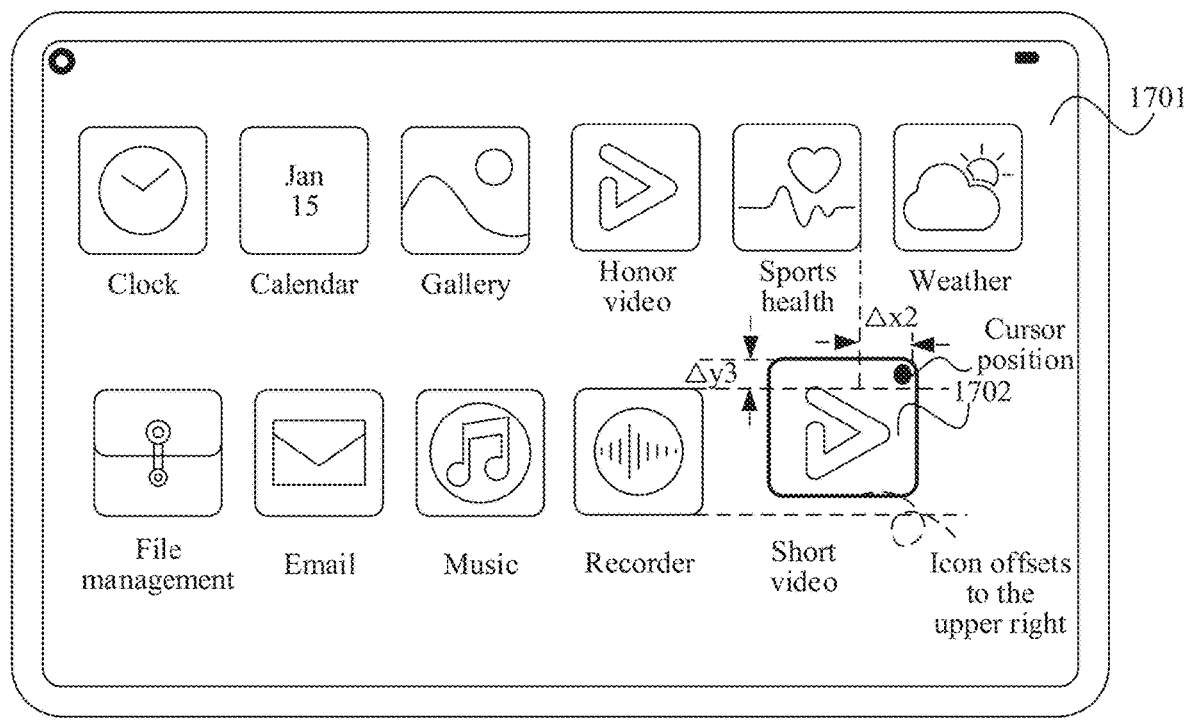

For example, referring to FIG. 17f, for example, the actual position of the cursor moves to the upper right of the short video icon control 1702 along with the mouse. Correspondingly, the short video icon control 1702 maintains the current size unchanged and moves to the upper right. For example, the current offset of the short video icon control in the X-axis direction is $\Delta x2$, and the offset in the y-axis direction is $\Delta y3$. It should be noted that the offset of the short video icon control refers to an original position relative to the short video icon control.

Figure 17G:
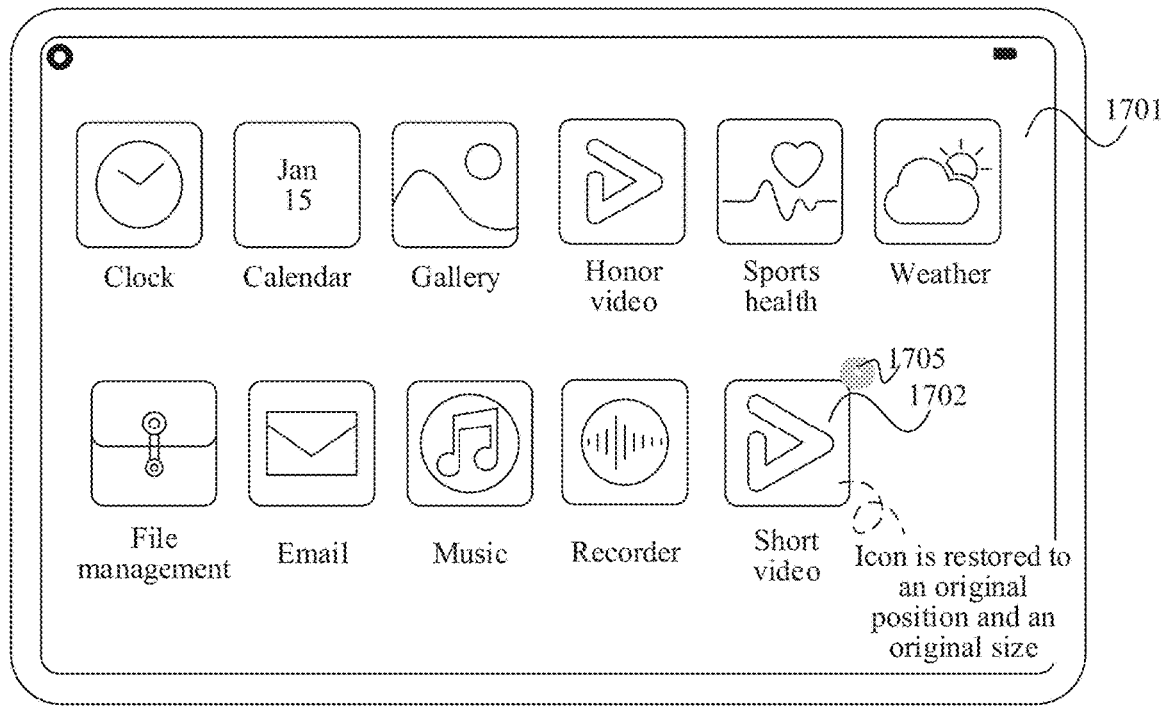

In a possible implementation, as shown in FIG. 17g, if the actual position of the cursor moves out of the short video icon control 1702 with the mouse, the view system draws a cursor 1705 on the display interface 1701. For related descriptions of the cursor 1705, reference may be made to FIG. 16, which is not repeated herein. For example, after the cursor moves out of the short video icon control 1702, the short video icon control 1702 gradually returns to the original size and the original position.

Figure 17H:
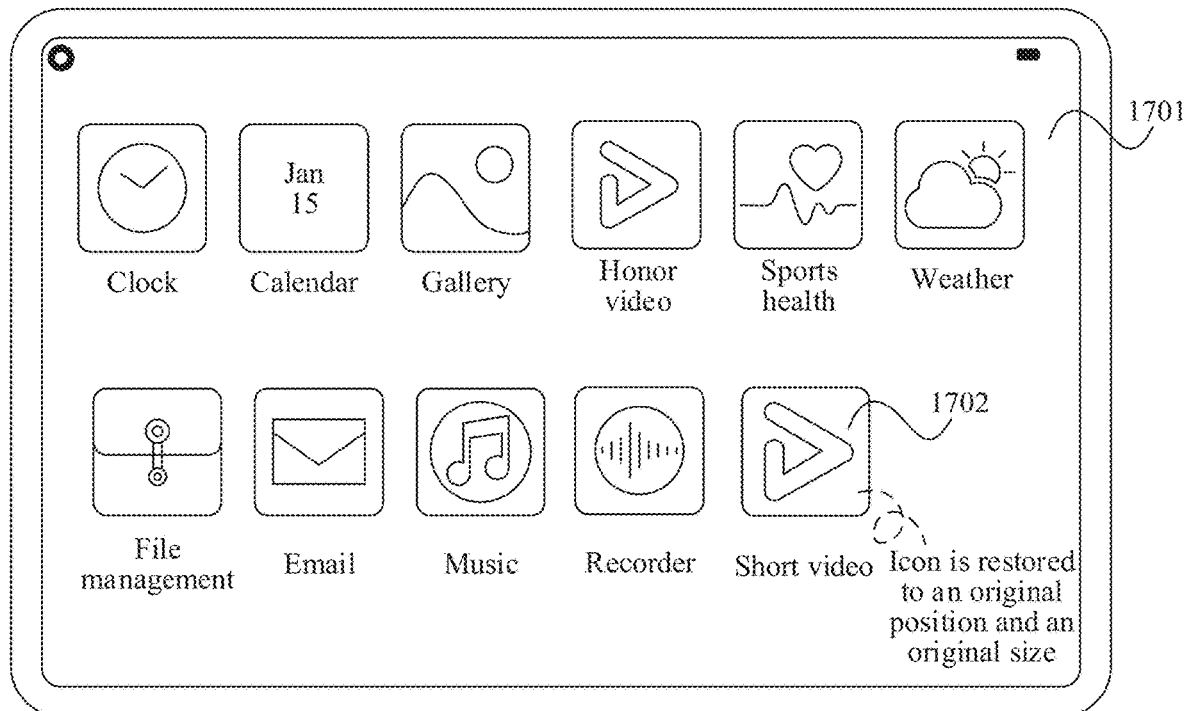

In another possible implementation, as shown in FIG. 17h, for example, if the actual position of the cursor is on the short video icon control 1702, the user clicks the mouse. In response to a received user operation, the view system gradually restores the short video icon control 1702 to the original size and the original position. Next, an interface of a short video application may be displayed on the display interface 1701.

Figure 17I:
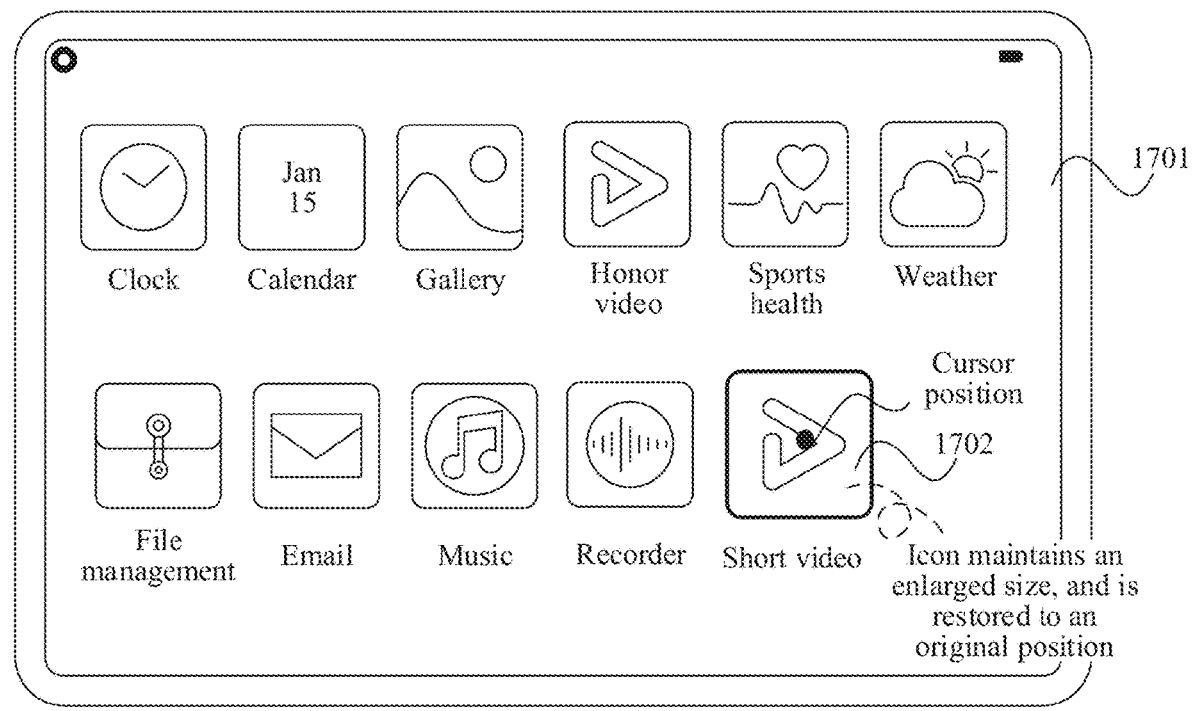

In yet another possible implementation, as shown in FIG. 17i, for example, if the actual position of the cursor is on the short video icon control 1702, the mouse leaves the desktop, or a finger of the user leaves the touchpad. Correspondingly, in response to a received user operation, the view system places the actual position of the cursor at a geometric center of the short video icon control 1702 by default. Correspondingly, according to the pulling manner, the view system maintains the current size of the short video icon control (that is, the enlarged size), and pulls the short video icon control 1702 to the original position of the short video icon control 1702.

It may be understood that to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or computer software driving hardware depends on particular applications and design constraints of the technical solutions. A person of skill in the art may use different methods to implement the described functions with reference to embodiments for each particular application, but it should not be considered that the implementation goes beyond the scope of this application.

Figure 18:
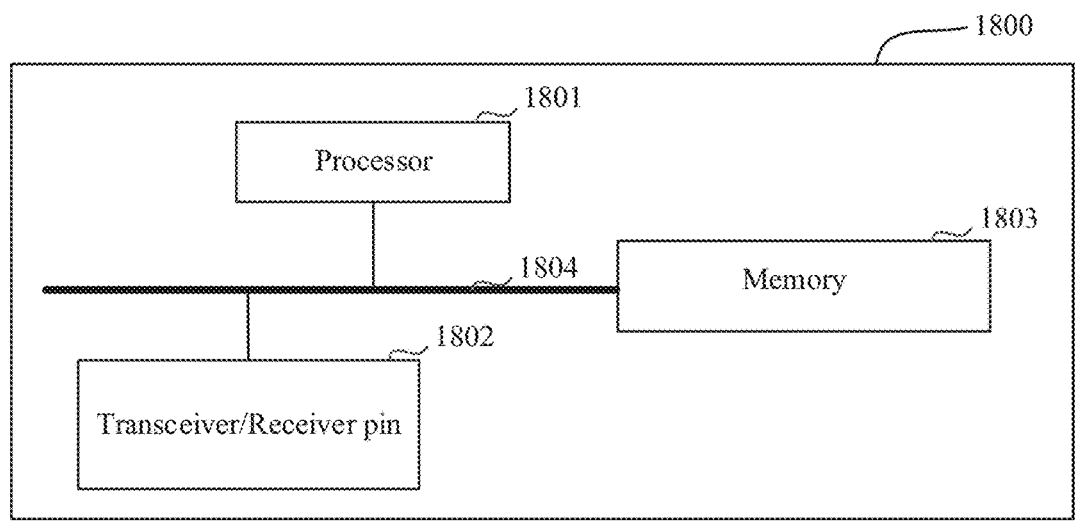
FIG. 18 exemplarily shows a schematic structural diagram of an apparatus.

In an example, FIG. 18 is a schematic block diagram of an apparatus 1800 according to an embodiment of this application. The apparatus 1800 may include: a processor 1801 and a transceiver/receiver pin 1802. Optionally, the apparatus 1800 further includes a memory 1803.

Various components of the device 1800 are coupled together through a bus 1804, where in addition to a data bus, the bus 1804 further includes a power supply bus, a control bus, and a status signal bus. However, for clear description, various types of buses in the figure are referred to as the bus 1804.

Optionally, the memory 1803 may be configured to store instructions in the method embodiments. The processor 1801 may be configured to execute the instructions in the memory 1803, and control the receiving pin to receive a signal, and control the sending pin to send a signal.

The apparatus 1800 may be the electronic device or the chip of the electronic device in the method embodiments.

All related content of the steps in the method embodiments may be referenced to function descriptions of corresponding function modules. Details are not repeated herein again.

This embodiment further provides a computer storage medium. The computer storage medium stores computer instructions, and when the computer instructions are run on an electronic device, the electronic device is enabled to perform the related method steps, to implement the cursor display method in the foregoing embodiments.

This embodiment further provides a computer program product. When the computer program product is run on a computer, a computer is enabled to perform the related steps, to implement the cursor display method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the cursor display method in the foregoing method embodiments.

The electronic device, the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of this application may be integrated into one processing unit, each of the units may exist alone physically, or two or more units are integrated into one unit. The integrated unit may be implemented in a form of hardware, or may be implemented in a form of a software functional unit.

Any content of each embodiment of this application, and any content of the same embodiment, may be freely combined. Any combination of the foregoing content is within the scope of this application.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a ROM (ROM), a RAM (RAM), a magnetic disk, or an optical disc.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

Methods or algorithm steps described in combination with the embodiments of this application disclosed herein may be implemented by hardware, or may be implemented by a processor by executing a software instruction. The software instruction may be formed by a corresponding software module, and the software module may be stored in a random access memory (RAM), a flash memory, a read only memory (ROM), an erasable programmable ROM (EPROM), an electrically erasable programmable ROM (Electrically EPROM, EEPROM), a register, a hard disk, a removable magnetic disk, a CD-ROM, or any storage medium of other forms well-known in the technical field. For example, a storage medium is coupled to a processor, so that the processor can read information from the storage medium or write information into the storage medium. Certainly, the storage medium may be a component of the processor. The processor and the storage medium may be located in an ASIC.

A person skilled in the art should be aware of that in the one or more examples, the functions described in the embodiments of this application may be implemented by hardware, software, firmware, or a combination of the above. When implemented by using software, the functions can be stored in a computer-readable medium or can be used as one or more instructions or code in a computer-readable medium for transferring. The computer-readable medium includes a computer storage medium and a communication medium, where the communication medium includes any medium that enables a computer program to be transmitted from one place to another. The storage medium may be any available medium accessible to a general-purpose or dedicated computer.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An electronic device, comprising:
a memory storing program instructions; and
a processor configured to execute the program instructions to cause the electronic device to perform operations comprising:
displaying a first cursor on a display interface;
moving the first cursor toward a first control on the display interface in response to a received first user operation;
detecting that a center of the first cursor moves to an edge of the first control, and cancel displaying of the first cursor;
displaying a second cursor in the first control, wherein a shape of the second cursor is the same as a shape of the first cursor, or the shape of the second cursor is different from a shape of the first cursor; and
enlarging and deforming the second cursor in the first control to obtain a third cursor, wherein a size of the third cursor is less than a size of the first control, and wherein a shape of the third cursor is the same as the shape of the first control, or the shape of the third cursor is different from the shape of the first control.

2. The electronic device according to claim 1, wherein the displaying the second cursor in the first control comprises:
obtaining a movement direction of the first cursor in a case that the center of the first cursor moves to the edge of the first control; and
displaying the second cursor on an extension line in the movement direction of the first cursor in the first control.

3. The electronic device according to claim 1, wherein the displaying the second cursor in the first control comprises:
obtaining a position of the first cursor in a case that the center of the first cursor moves to the edge of the first control; and
displaying the second cursor on an extension line in a vertical direction of the position of the first cursor in the first control, or displaying the second cursor on an extension line in a horizontal direction of the position of the first cursor in the first control.

4. The electronic device according to claim 1, wherein the displaying the second cursor in the first control comprises:
displaying the second cursor at a position in the first control that is tangent to the edge of the first control.

5. The electronic device according to claim 1, wherein the third cursor is displayed below the first control, or the first cursor is in a shape of a round rectangle.

6. The electronic device according to claim 1, wherein the first control is a desktop icon control, and the third cursor is transparent.

7. The electronic device according to claim 1, wherein the enlarging and deforming the second cursor in the first control to obtain the third cursor comprises:
moving the second cursor in the first control in response to a received second user operation in a process of enlarging and deforming the second cursor in the first control.

8. The electronic device according to claim 1, wherein the processor executing the program instructions further causes the electronic device to:
move the third cursor in the first control in response to a received third user operation.

9. The electronic device according to claim 1, wherein a circumference of the first cursor is greater than a circumference of a circle with radius r and less than 8 r.

10. The electronic device according to claim 1, wherein a circumference of the first cursor is less than a circumference of a circle with radius r and greater than $4\sqrt{2}r$.

11. A cursor display method, comprising:
displaying a first cursor on a display interface;
moving the first cursor toward a first control on the display interface in response to a received first user operation;
detecting that a center of the first cursor moves to an edge of the first control, and canceling displaying of the first cursor;
displaying a second cursor in the first control, wherein a shape of the second cursor is the same as a shape of the first cursor, or the shape of the second cursor is different from the shape of the first cursor; and
enlarging and deforming the second cursor in the first control to obtain a third cursor, wherein a size of the third cursor is less than a size of the first control, and wherein a shape of the third cursor is the same as the shape of the first control, or the shape of the third cursor is different from a shape of the first control.

12. The method according to claim 11, wherein the displaying the second cursor in the first control comprises:
obtaining a movement direction of the first cursor in a case that the center of the first cursor moves to the edge of the first control; and
displaying the second cursor on an extension line in the movement direction of the first cursor in the first control.

13. The method according to claim 11, wherein the displaying the second cursor in the first control comprises:
obtaining a position of the first cursor in a case that the center of the first cursor moves to the edge of the first control; and
displaying the second cursor on an extension line in a vertical direction of the position of the first cursor in the first control, or displaying the second cursor on an extension line in a horizontal direction of the position of the first cursor in the first control.

14. The method according to claim 12, wherein the displaying the second cursor in the first control comprises:
displaying the second cursor at a position in the first control that is tangent to the edge of the first control.

15. The method according to claim 11, wherein:
the third cursor is displayed below the first control; or
the first cursor is in a shape of a round rectangle; or
the first control is a desktop icon control and the third cursor is transparent.

16. The method according to claim 11, wherein the enlarging and deforming the second cursor in the first control to obtain the third cursor comprises:
moving the second cursor in the first control in response to a received second user operation in a process of enlarging and deforming the second cursor in the first control.

17. The method according to claim 11, further comprising:
  moving the third cursor in the first control in response to a received third user operation.

18. The method according to claim 13, wherein a circumference of the first cursor is greater than a circumference of a circle with radius r and less than 8 r.

19. The method according to claim 13, wherein a circumference of the first cursor is less than a circumference of a circle with radius r and greater than $4\sqrt{2}r$.

20. A non-transitory computer-readable storage medium storing a computer program, wherein the computer program, when run on an electronic device, enables the electronic device to perform steps comprising:
  displaying a first cursor on a display interface;
  moving the first cursor toward a first control on the display interface in response to a received first user operation;
  detecting that a center of the first cursor moves to an edge of the first control, and canceling displaying of the first cursor;
  displaying a second cursor in the first control, wherein a shape of the second cursor is the same as a shape of the first cursor, or the shape of the second cursor is different from the shape of the first cursor; and
  enlarging and deforming the second cursor in the first control to obtain a third cursor, wherein a size of the third cursor is less than a size of the first control, and wherein a shape of the third cursor is the same as the shape of the first control, or the shape of the third cursor is different from a shape of the first control.

* * * * *